United States Patent [19]

McKeeman et al.

[11] Patent Number: 5,754,860
[45] Date of Patent: May 19, 1998

[54] METHOD AND APPARATUS FOR SOFTWARE TESTING USING A DIFFERENTIAL TESTING TECHNIQUE TO TEST COMPILERS

[75] Inventors: William M. McKeeman, Hollis; August C. Reinig, Hudson, both of N.H.; Andrew Payne, Lincoln, Mass.

[73] Assignee: Digital Equipment Corporation, Maynard, Mass.

[21] Appl. No.: 685,346

[22] Filed: Jul. 23, 1996

[51] Int. Cl.$^6$ .................................................. G06F 9/44
[52] U.S. Cl. ..................................... 395/704; 395/705
[58] Field of Search ............................. 395/704, 701, 395/705, 183.14; 364/551.01, 570, 580, 582

[56] References Cited

U.S. PATENT DOCUMENTS

| 4,819,233 | 4/1989 | Delucia et al. | 395/704 |
| 5,255,385 | 10/1993 | Kikuchi | 395/704 |
| 5,317,740 | 5/1994 | Sites | 395/704 |
| 5,317,741 | 5/1994 | Schwanke | 395/704 |
| 5,361,351 | 11/1994 | Lenkov et al. | 395/704 |
| 5,428,788 | 6/1995 | Schwanke | 395/704 |
| 5,432,795 | 7/1995 | Robinson | 395/704 |
| 5,495,571 | 2/1996 | Corrie, Jr. et al. | 395/704 |
| 5,560,000 | 9/1996 | Lenkov et al. | 395/704 |
| 5,590,330 | 12/1996 | Goskun et al. | 395/704 |
| 5,668,999 | 9/1997 | Gosling | 395/704 |

OTHER PUBLICATIONS

Introduction to Automata Theory, Languages, and Computation, J. Hopcroft et al., Addison–Wesley Series in Computer Science, pp. 77–85.

"Cb: A Low-level Subset of C", W. McKeeman, Journal of C Language Translation, vol. 3, No. 3, 1991, pp. 214–226.

"Avoiding Arithmetic Exceptions in Constant Expression Evaluation", W. McKeeman, Journal of C Language Translation, vol. 4, No. 4, 1993, pp. 291–295.

"Dynamic Syntax: A Concept for the Definition of the Syntax of Programming Languages", K. Hanford et al., IBM Technical Report No. T.R. 12.090, 1971, pp. 1–46.

A Random Generator for the Automatic Production of Executable PL/1 Programs (APEX), P. Schofield et al., IBM Technical Report No. TR.12.062, 1966, pp. 1–11.

"The Syntax Machine An Introduction", S. Glassover et al., IBM Technical Report No. TR.12.077, 1968, pp. 1–65.

"The Syntax Machine A description", S. Glassover et al., IBM Technical Report No. TR.12.078, 1967, pp. 1–9.

A retrospective view of APEX (Automatic production of executable programs), C. Jones, IBM Technical Report No. TR.12.065, 1966, pp. 1–20.

*Primary Examiner*—Kevin A. Kriess
*Attorney, Agent, or Firm*—Anne E. Saturnelli; Arthur W. Fisher

[57] ABSTRACT

Techniques used in testing software are described. A test generator produces a source program used to test two or more compilers using a differential testing technique. The test generator includes a grammar with added semantic constraints to minimize the generation of non-conforming source programs. The source program is a conforming source program conforming to constraints included in a programming language standard. By using properties of a conforming source code, a differential testing technique is described in which a test failure indicates that one or more of the compilers is not processing the source program correctly in accordance with the programming language standard. If a test failure is detected, the source program causing the test failure is reduced using various reduction and simplification techniques.

30 Claims, 14 Drawing Sheets

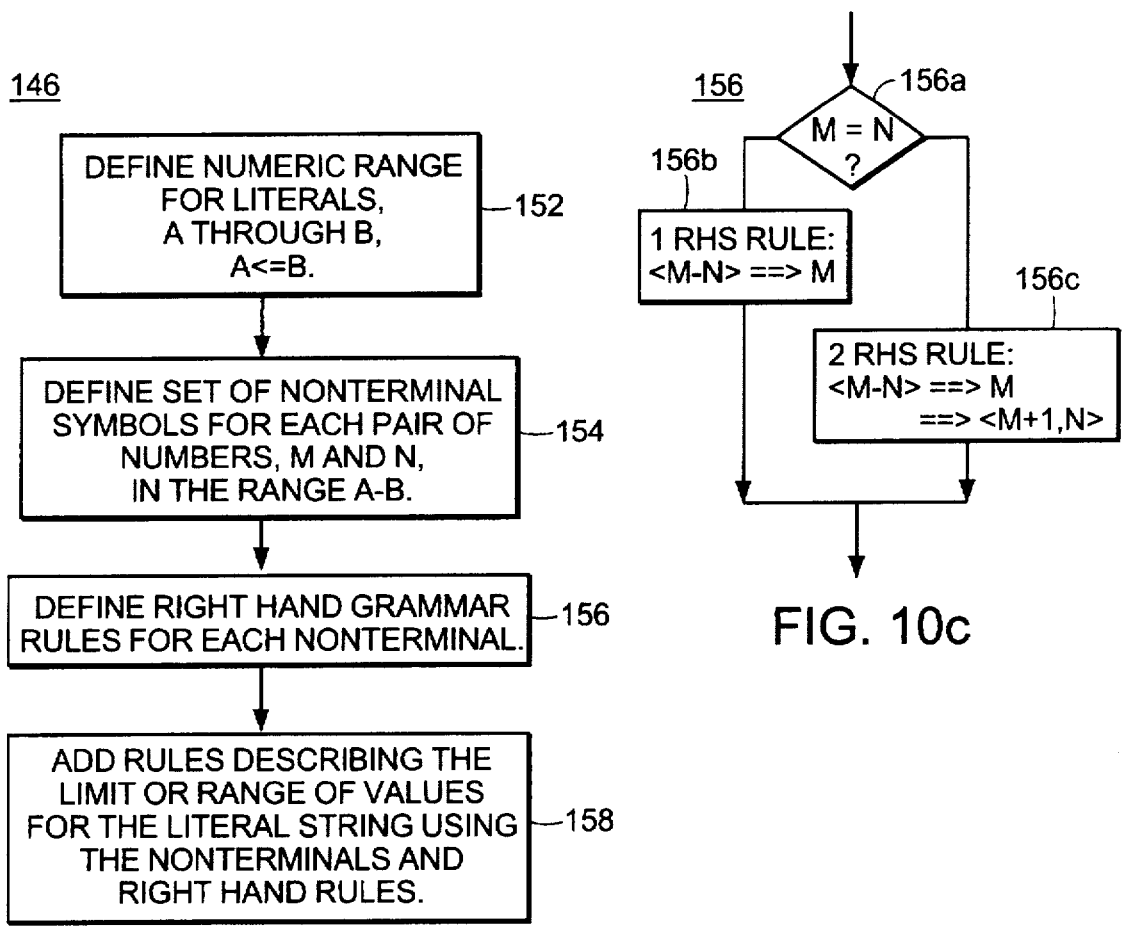
FIG. 10b
FIG. 10c
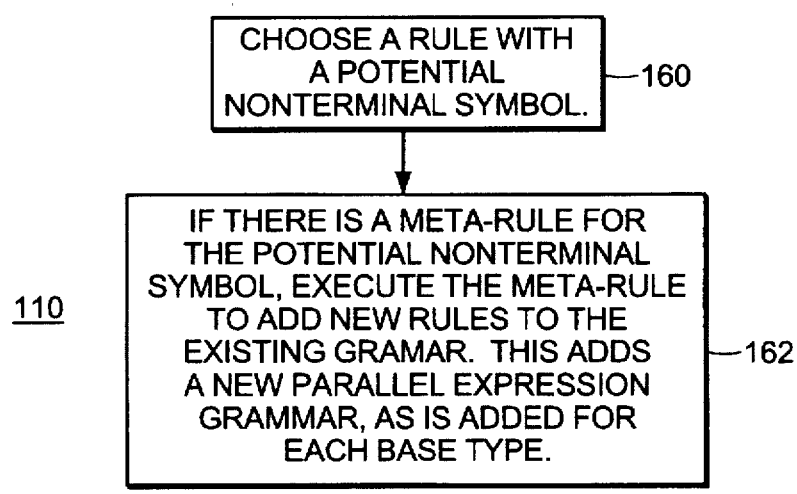
FIG. 11

METHOD AND APPARATUS FOR SOFTWARE TESTING USING A DIFFERENTIAL TESTING TECHNIQUE TO TEST COMPILERS

BACKGROUND OF THE INVENTION

This invention relates generally to computer systems and more particularly to methods and apparatus for testing computer programs executing in a computer system.

As it is known in the art, testing software is an ongoing task in software development and maintenance activities which requires a large portion of time, computer and human resources and effort. Software development typically includes the development of an entirely new application or program or the addition of a new feature to an existing application. Software maintenance activities generally include the correction of reported problems.

Software testing is typically performed with the goal of verifying proper functioning of new software as well as to verify the correctness of a modification or an improvement to existing software.

Generally, testing software includes performing several different tasks. One such task is generating test programs ("source programs") and test data. Test programs and test data are typically included in a test suite and used to test and verify the correctness of certain aspects of software. For example, test programs are used to test the correctness of an object file produced by a compiler. A syntactically and semantically correct test program written in a particular computer programming language is used to test a corresponding compiler which processes that particular programming language. Certain behavior is expected of the compiler while compiling a test program and producing a corresponding object file. Similarly, to test the contents of the object file and insure that the compiler has produced an object file which contains correct machine instructions, the runtime behavior of a machine executable (or "binary image") which includes the object file is examined and certain run time behavior and output are expected.

One problem encountered when generating test programs is that an efficient technique which produces correct or conforming test programs is needed. A correct or conforming program is generally a program which meets certain syntactic, semantic and run-time constraints, such as constraints specified in a programming language standard, like the "C" programming language standard provided by the American National Standards Institute (ANSI).

A syntactic constraint is a constraint regarding the syntax or structure and form of a test program. A semantic constraint is a constraint regarding the semantics or meaning of statements included in a test program. Generally, a syntactic or semantic constraint is also classified as either a runtime or a non-runtime constraint. A runtime constraint is a constraint determinable at execution time ("runtime") when executing a machine executable program, for example, produced using a test program. A non-runtime constraint is determinable prior to execution time. Syntactic constraints are non-runtime constraints. Some semantic constraints are runtime constraints. Others are classified as non-runtime constraints.

One technique used to generate conforming test data or test programs includes manually writing each test program. For example, each data case or program is manually entered into a file in a computer system using an input device such as a keyboard connected to a terminal.

This technique has several drawbacks. One drawback is that when such data entry is performed manually, it is often cumbersome and time-consuming. Also the possibility of a data entry error causing an incorrect test case or an erroneous portion of a test program to be entered generally increases with manual data entry. Another drawback is that a human typically constructs each test case or program. This often results in incomplete testing coverage since a particular combination of elements included in a data set or program is easily omitted, particularly as the complexity of software being tested increases the probability that a necessary test case is omitted also increases since the various combinations of elements to be tested increases. In summary, manual data entry is typically costly, inefficient and prone to human error.

Another known technique for generating test programs or test data includes using a tool such as a software tool to automatically generate a test program or test data. However, current tools used for this purpose have drawbacks and often lack desirable features and functions, for example, as being able to efficiently generate test programs while maximizing the possibility that the test programs are conforming test programs.

Another part of software testing includes problem detection. In other words, a technique is used to detect when software does not perform as expected. For example, a compiler compiles a particular computer program and produces an object file which is then linked and incorporated into a machine executable (or "binary image"). The machine executable is subsequently executed and produces a corresponding output. An existing problem detection method compares a predetermined correct output (or "baseline") to the corresponding output. By this comparison a determination is made as to whether the other output is also correct. The foregoing testing technique is generally referred to as regression testing.

One drawback with this problem detection technique is producing a predetermined correct output file. This is typically a cumbersome and time consuming task typically involving manual examination of the output produced from execution of a machine executable program.

A third task included in software testing is problem reduction. Once an error has been detected, techniques are needed to reduce a program revealing the error to a smaller program also revealing the error. This technique is typically used to assist a developer or a maintainer in determining the cause of an error. One problem is how to reduce a large program, for example, which reveals an error in a compiler, to a smaller, more manageable program also revealing the problem.

One technique typically used to reduce a large program producing an error to a smaller program which also reveals the same error is to manually eliminate certain statements or portions of statements of a test case. For example, a particularly large program written in a programming language causes incorrect run time output in existing systems. A line of code included in the program is deleted. By subsequently compiling, linking and re-executing the machine executable produced using the modified computer program, a smaller program revealing the same error can be derived by iteratively repeating the foregoing steps. One drawback with this technique for problem or error reduction is that it is generally time-consuming and cumbersome in that a programmer or maintainer typically removes a small segment of code, such as a single line or a portion of a single line of code, manually with each iteration to insure that the remaining code after removal of the segment also reveals the error.

Thus, there is required a new system for software testing which generates effective test programs in a convenient and efficient manner, detects problems without requiring a predetermined correct baseline, and which accurately reduces the test program revealing the detected problem to a smaller program also revealing the problem.

BRIEF DESCRIPTION OF THE DRAWINGS

The above-mentioned and other features of the invention will now become apparent by reference to the following description taken in connection with the accompanying drawings, in which:

FIG. 10b and FIG. 10c are flowcharts showing example embodiments of methods for adding grammar rules describing integer literals;

FIG. 11 is a flowchart showing an example embodiment of a method for dynamically modifying an initial grammar to include derives type constraints;

SUMMARY OF THE INVENTION

In accordance with principles of the present invention, a method executed in a computer system for testing machine executable programs is disclosed. In the disclosed system, a test program is generated. Using a first language processor and the test program, a first machine executable is produced. The first machine executable is executed producing a first output. Using a second language processor and the test program, a second machine executable is produced. The second machine executable is executed producing a second output. It is determined if there is a difference between the first and second outputs. A test failure is detected if there is a difference between the first and second outputs and the test program conforms to a runtime constraint included in a standard. The standard specifies how a machine executable produced using the test program behaves if the test program conforms to constraints, such as the runtime constraint, included in the standard. The test failure indicates that one of the first or second language processors is not in compliance with the standard.

Further in accordance with principles of the invention, a method of generating a test program is disclosed. In the disclosed method, a nonterminal symbol of a grammar is expanded in accordance with grammar rules by selecting one or more of the grammar rules. The grammar rules describe statements of a programming language. One of the grammar rules is dynamically modified in response to selecting a grammar rule during expansion of the nonterminal. A new rule is dynamically added to the grammar rules in response to selecting a grammar rule during expansion of the nonterminal. Expansion continues until all nonterminal symbols have been expanded producing a derived string of terminal symbols. The derived string is used to produce the test program.

Yet further disclosed in accordance with principles of the invention is a test generator. The disclosed test generator includes a grammar, a subsystem for expanding a nonterminal symbol included in the grammar by selecting one or more grammar rules included in the grammar, a subsystem for dynamically modifying one of the grammar rules, a subsystem for dynamically adding one or more grammar rules to the grammar, and a source code producer for generating a test program using terminal symbols derived from a portion of the grammar rules selected. The grammar includes grammar rules describing statements of a language in which the statements conform to a portion of a set of predetermined constraints, one or more nonterminal symbols, and one or more terminal symbols.

Thus, there is provided a new system for software testing which generates effective test programs in a convenient and efficient manner, detects problems without requiring a predetermined correct baseline, and which accurately reduces the test program revealing the detected problem to a smaller program also revealing the problem.

DESCRIPTION OF THE PREFERRED EMBODIMENTS

Figure 1:
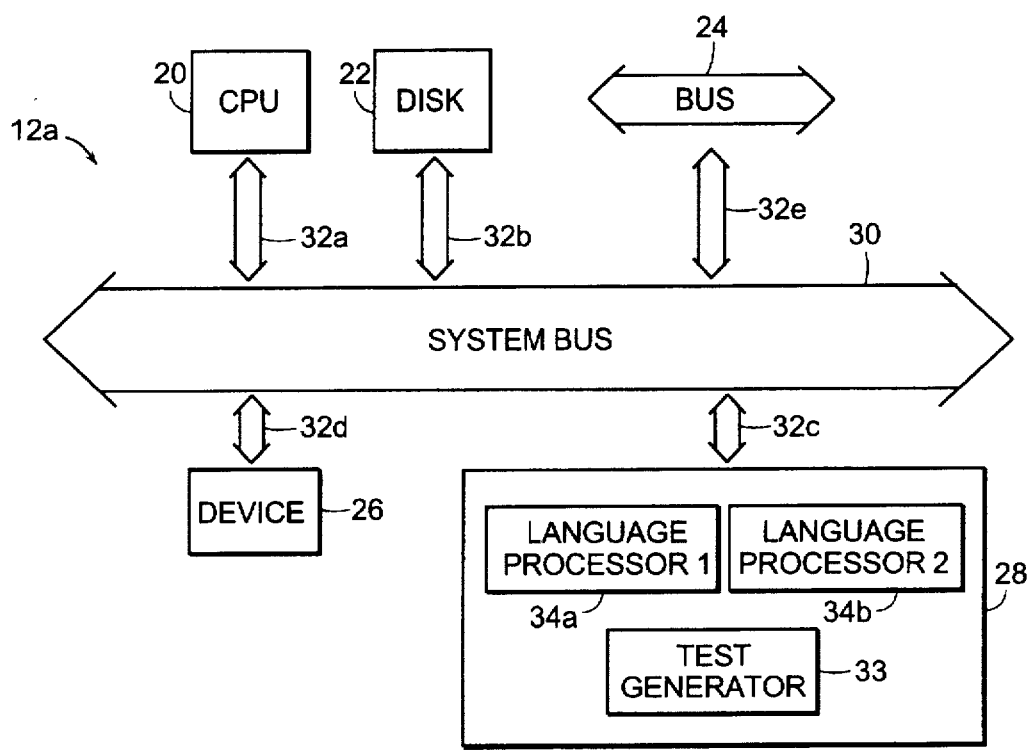
FIG. 1 is a block diagram of a computer system.

Referring now to FIG. 1, an example embodiment of a computer system 12a is shown to include a central processing unit (CPU) 20, a computer disk drive 22, a system bus 30, system device 26 (for example, an input device such as a keyboard connected to a terminal), and a main memory 28, each interconnected by system bus 30 via bus interfaces 32a–32d. A second bus 24 such as an I/O bus or another system bus is also connected to the system bus 30 via bus interface 32e. The CPU, disk drive, other system device, second bus and main memory communicate over the system bus 30.

Machine executable programs, such as test generator 33, are loaded into main memory for execution by the CPU. A machine executable program typically contains machine instructions to be executed by the CPU which reads in the machine executable program from memory over the bus and executes the machine instructions. A test generator 33 is, for example, a machine executable program comprising machine instructions and is loaded into memory, for example, from a computer disk using disk drive 22. The test generator 33 produces test data used to test machine executable programs, for example, such as language processors 34a and 34b also shown in main memory. The test generator will be described in more detail in following paragraphs.

Also shown in main memory 28 are language processors 34a and 34b which are other machine executables also loaded into main memory 28. A language processor, such as a compiler, is generally a machine executable program which processes statements written in a particular programming language, for example, the "C" programming language, and produces a corresponding object file. The corresponding object file is subsequently linked to produce a machine executable program which, when executed, exhibits an expected run-time behavior. Expected run-time behavior includes, for example, producing an expected output. Expected run-time behavior may also include, for example, producing no output.

In the example embodiment of FIG. 1, a technique used in testing and verifying the correctness of a language processor output is by examination of the runtime behavior of a machine executable program produced using the language processor output. Using this technique, for example, the content of an object file produced by a compiler is verified to insure that the object file contains correct machine instructions in accordance with a corresponding input file previously processed by the compiler to generate the object file.

Compilers in compliance with a particular programming language standard, such as a "C" compiler conforming to the ANSI "C" programming language standard, are typically required to behave in a particular manner when processing an input or source file deemed to be a conforming program. A programming language standard typically specifies syntactic, semantic, and runtime constraints which test programs need to meet in order to be a conforming program. Specific runtime behavior is thus generally expected when a machine executable program produced using an object file generated by a standard compliant compiler is executed, and the source program used to generate the object file is a conforming source program.

A correct or conforming source program is generally a source program in conformance with runtime and non-runtime constraints included in a standard, such as a programming language standard. In other words, a conforming program is a program that meets syntactical and semantic constraints specified in the programming language standard. Some of these constraints are determinable at runtime, i.e., runtime constraints, by executing a machine executable program produced using a corresponding source program. Non-runtime constraints, such as syntactic and some semantic constraints, are determinable at compile time.

In the example embodiment of FIG. 1, the present system uses test techniques which use conforming programs. Thus the test generator 33 will generally be described in the context of producing conforming test programs used in these testing techniques. However, as will become apparent to one skilled in the art, various testing and test generation techniques which are described in following paragraphs can be easily adapted and modified for other purposes. For example, a syntactically incorrect program can be generated using an alternate embodiment of the test generator 33 which generates syntactically incorrect programs. These syntactically incorrect programs can be used to test compile time error messages. Similarly, another alternate embodiment of the test generator 33 generates a syntactically correct program used to produce a machine executable which, when executed, does not meet certain runtime constraints. This syntactically correct program can be used to test run-time error messages and run-time checking within a run-time system associated with a language processor such as 34a or 34b.

Figure 2:
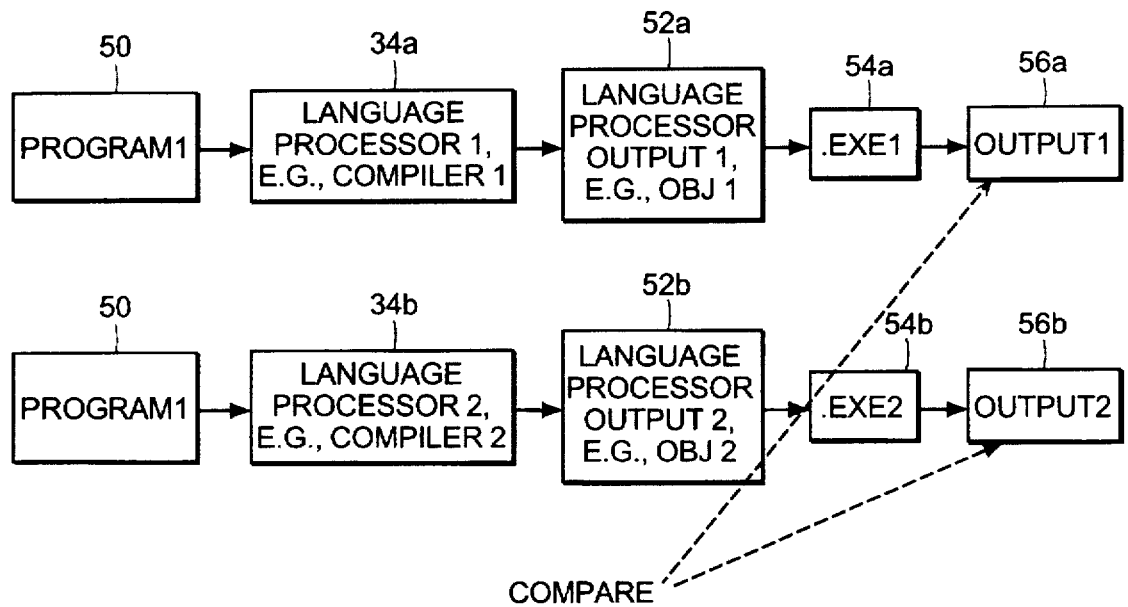
FIG. 2 is depicts an example embodiment of a technique for determining a runtime execution test case failure.

Referring now to FIG. 2, an example embodiment of a technique used to detect a run-time test failure is illustrated. The example embodiment of FIG. 2 referred to herein as a differential testing technique, uses a conforming program 50 with two language processors 34a and 34b to determine if the two language processors correctly process a conforming source program. The differential testing technique is used, for example, to detect when a language processor, for example a compiler, fails to comply with a standard, for example a programming language standard.

In FIG. 2, a conforming source program 50 is processed by a language processor, such as compiler 1 34a, producing a corresponding output, such as object file 52a, which is subsequently linked to produce a machine executable 54a which, when executed, produces an output file 56a. Source program 50 is also processed by a second language processor, such as compiler 34b, which produces a second output, such as object file 52b, which is subsequently linked to produce a machine executable 54b which, when executed, produces output file 56b. The output files 56a and 56b are compared and it is determined if differences exist between the two output files. If a difference is detected, there is deemed to be a run-time test failure signifying developer attention being needed to determine the cause of the differences in output. If no difference between output files 56a and 56b is detected, no test failure is flagged and, therefore, no developer attention is required.

The technique illustrated in FIG. 2 does not require a preliminary determination for correctness of a first output file 56a. The technique illustrated in FIG. 2 relies upon the property that if a source program conforms to constraints specified in a programming language standard, and the source program is processed by multiple compilers, each compiler being in compliance with the programming language standard, each of the multiple compilers should produce a corresponding object file used to generate a corresponding output and each of the corresponding outputs should be equivalent. In other words, if the corresponding outputs 56a and 56b are not equivalent, typically at least one of the language processors 34a or 34b is faulty. Unless a difference is detected between outputs 56a and 56b, an error in language processors 34a and 34b is presumed not to be revealed by a conforming source program.

One of the benefits of the differential testing technique of FIG. 2 is that the often cumbersome and time-consuming task of forming a benchmark or correct output is not required as in the existing regression testing techniques. The differential testing technique of FIG. 2 may be used, for example, when comparing two different C compilers, each complying with the ANSI "C" programming language standard using a standard conforming program 50 meeting syntactic, semantic and run-time constraints specified in the corresponding standard.

In using the testing technique illustrated in FIG. 2, standard conforming programs are needed to test a compiler. There are alternate methods in which a conforming program can be produced to test a compiler. These include manual generation in which a programmer manually enters keystrokes from a keyboard and terminal into a file for example. Another technique to generate programs which are conforming is to use a software tool, such as the test generator 33, which automates the generation of test programs, such as program 50 illustrated in FIG. 2.

Figures 3, 4:
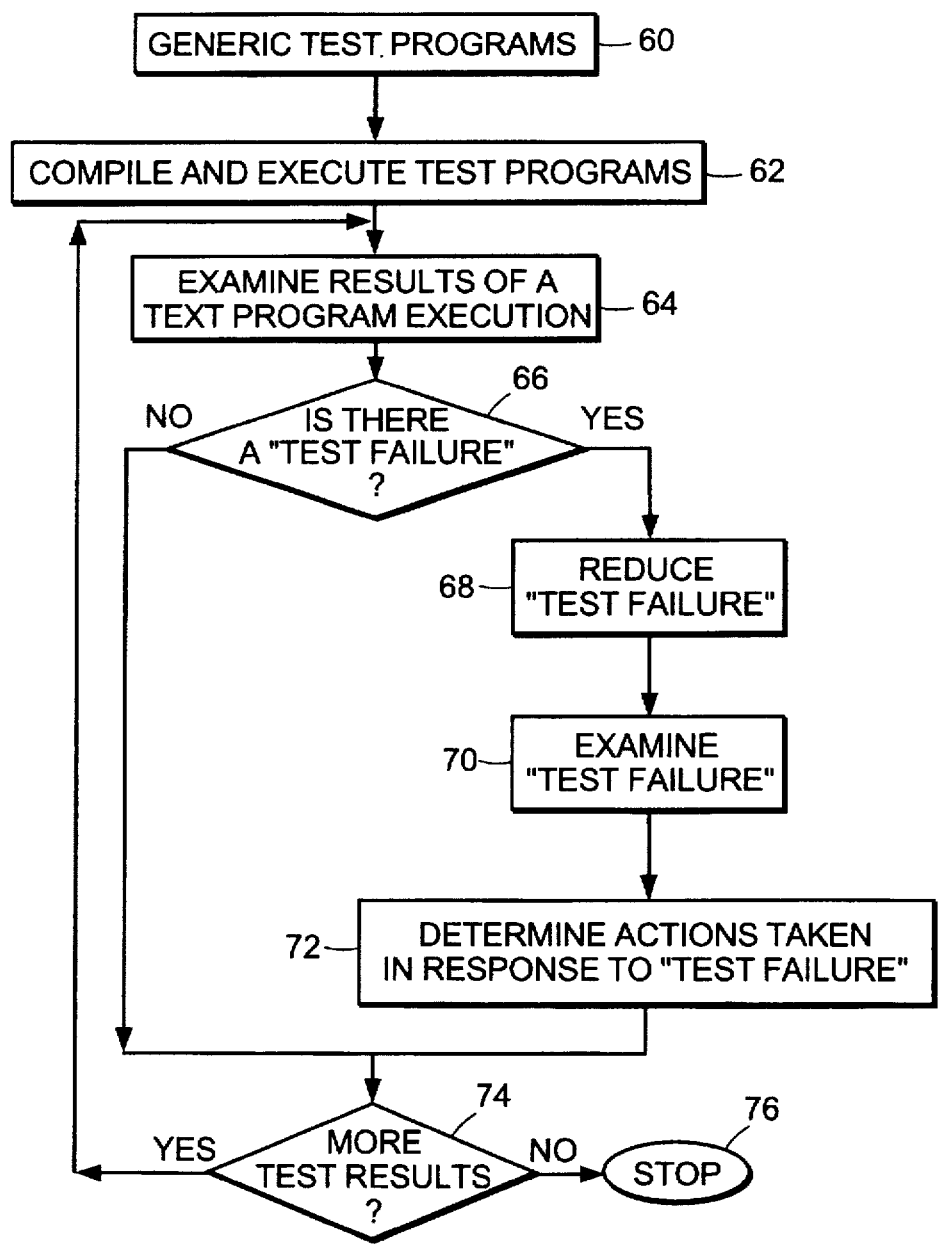
FIG. 3 is a flowchart showing runtime data flow of an example embodiment of a test generator included in the computer system of FIG. 1.
FIG. 4 is a flowchart showing an example embodiment of a method for generating a test program and executing the test program in testing of software.

Referring now to FIG. 3, an example embodiment of a run time data flow diagram for a test generator 33 as included in the computer system of FIG. 1 is shown. The test generator 33 takes user input 84, as from a keyboard and/or mouse connected to terminal, and produces a test program 50 which is standard conforming.

Examples of user input 84 used by the test generator 33 are given in following paragraphs. Note that the amount and type of user input, if any, varies with implementation of the test generator 33. As will be recognized by those skilled in the art, the fact that the test generator 33, as shown in FIG. 3, includes user input does not imply that user input is required in all embodiments of the test generator 33.

Many different techniques can be used within a test generator 33 to generate standard conforming (or "conforming") programs. In one example test generation technique, the test generator includes a grammar which is used to generate a test program 50 which is standard conforming. The grammar is a context free grammar (CFG) used to randomly generate a program which is standard conforming. A grammar, such as a CFG, as known to those skilled in the art, is generally defined by a set of nonterminal symbols, a set of terminal symbols, one or more production or grammar rules (or "rules"), and a start symbol. Generally using a grammar, a string of terminal symbols is derived from the start symbol. Beginning with the start symbol and applying grammar rules, nonterminal symbols are "expanded" and replaced with other nonterminal symbols and terminal symbols. The rules are repetitively applied to each nonterminal symbol until all nonterminal symbols have been expanded and replaced with terminal symbols. Generally, a left hand side (LHS) of a grammar rule contains a nonterminal symbol which is replaced with the right hand side (RHS) of a grammar rule comprising zero or more nonterminals, and zero or more terminal symbols.

In examples and text which follow below, nonterminal symbols are enclosed within the symbols "<" and ">" for notational purposes only. An embodiment of the test generator 33 will generally not include such a definition for nonterminal symbols included in its grammar rules.

In text that follows an example grammar will be shown which produces strings comprising the letters "c", "d" and "e".
Example Grammar:
  nonterminal symbols={<A>, <B>, <C>, <D>}
  terminal symbols={c, d, e}
  start symbol={<A>}
  grammar rules=

1. <A>→<B>e
2. <B>→<D>dd
3. <B>→<C>cc
4. <C>→cc
5. <D>→d
6. <D>→<D>d

In the foregoing example, nonterminal symbols (or "nonterminals") <A>, <B>, <C> and <D> are expanded and replaced with other nonterminal and/or terminal symbols (or "terminals") in accordance with the above grammar rules. A string (also "terminal string", or "string of terminals") produced by applying the grammar rules 1, 2 and 5 produces the string "ddde". The grammar describes a set of valid strings which can be produced by selecting and applying the grammar rules. When there is more than one grammar rule which can be applied to a nonterminal, such as rules 2 and 3 when attempting to expand nonterminal <B>, one of rules 2 or 3 is selected.

Typically, a grammar is used within a compiler to recognize syntactically valid programs. However, within a preferred embodiment of the test generator 33, a grammar is used to randomly generate a test program, such as test program 50. In the foregoing example grammar, a set of valid strings is described and produced by applying grammar rules. In an example embodiment of the test generator 33 which will be described below, a grammar is used to describe programs which are valid in a particular programming language.

In using a grammar to generate test programs, nonterminal symbols are expanded by selecting and applying grammar rules until a resulting string of terminal symbols is derived. When there are multiple rules which can be applied to a nonterminal, a rule is selected during program generation as the rule to be applied when generating a particular program. Having multiple rules from which to select can also be viewed as having the same left hand side (LHS) or nonterminal symbol with multiple corresponding right hand side (RHS) alternatives from which to choose.

When generating programs using a grammar which includes grammar nonterminals (LHS) having multiple corresponding rules from which to select, the test generator 33 assigns probabilities or frequencies to each of the multiple corresponding rules. For a given nonterminal symbol (LHS) being expanded, these probabilities affect the chance of selecting each corresponding RHS rule with respect to other corresponding RHS rules. For example, in the above grammar nonterminal <B> can be expanded or replaced by applying either rule 2 or 3. A percentage or frequency can be assigned and associated with each of these rules determining the frequency with which rules 2 and 3 are selected when expanding nonterminal <B>, as during test program generation. A grammar which has probabilities associated with the various rules is typically referred to as a "stochastic grammar".

As described above, within the test generator 33 are grammar rules which are used to derive a terminal string representing a test program. By controlling the probabilities or frequencies associated with each rule, control is exerted over what types of statements and language elements are included in a generated test program. For example, when generating a test program including "C" programming language statements, if the program generated should not contain any arithmetic operations, those grammar rules associated with producing arithmetic operations have their probabilities or frequencies set to zero such that that rule is not selected. Similarly, by increasing a frequency or probability a rule is more frequently selected with respect to other rules for the same nonterminal symbol.

An example embodiment of the test generator 33 uses user input 84 in selecting the probabilities or frequencies associated with each grammar rule. For example, in one embodiment of the test generator 33, the test generator is a window-based software application. User input regarding the frequency of certain arithmetic operations is input through a slide bar included in the graphical user interface for the test generator 33. If the arithmetic operations are addition, subtraction, multiplication and division, a slide bar may be associated with each of the operations allowing the user to select the relative frequency of operations among the various operators. For example, a user may select the addition operator to appear five times more frequently than the multiplication operator, and additionally select no subtraction and division operations. The user selects a relative frequency of 5 for the addition operator, a relative frequency of 1 for the multiplication operator, and 0 for the subtraction and division operators.

Additional user input may be used in an embodiment of the test generator 33 to generate a test program 50. An additional example of other user input will be described in other portions of the specification which follow.

An example embodiment of the test generator 33 will now be described in which the test generator is used to generate source programs conforming to a version of the ANSI "C" programming language standard. A technique will be described in following paragraphs that may employed in the generation of source programs in accordance with programming language and should not be construed as being restricted to the "C" programming language or the ANSI "C" language standard. The technique for generating a test program also need not be restricted to a programming language standard. As will be recognized by those skilled in the art, the testing techniques described herein may also be applied to any other standard description for generating test data or programs used in testing software, such as compilers.

Referring now to FIG. 4, an example embodiment of a method for generating a test program and executing the test program to test compilers is shown. The method steps of FIG. 4 represent the overall testing process from program generation to determining whether a test has failed or succeeded in accordance with the differential testing technique previously described. Test program source code is generated at step 60. Step 60 can include the generation of one or more test program source codes. In step 62 the test programs are each compiled and executed. For each of the programs compiled and executed, particular run time behavior or results is predetermined for each program. At step 64 the results of one of the test programs previously compiled and executed is examined.

At step 66 a determination is made as to whether there is a test failure for the test results examined. A test failure may, for example, be determined by comparison of outputs and detection of inequality therein as in comparison of 56a and 56b of FIG. 2. If a test failure is detected at step 66, control proceeds to step 68 where the test failure is then reduced. This reduction of the test failure is generally a reduction of the failing test program source code to a smaller, simpler version of the test program source code which also reveals the test failure.

At step 70 the test failure is examined. At step 70 the previously reduced test source program is examined. The purpose of previous step 68 is to reduce the amount of work required in step 70 by reducing the test program to the smallest possible size using heuristics which will be described below. At step 72 actions are taken in response to the test failure. At step 72, a broad range of actions may be taken. For example, the test source code of the failing program can be incorporated into an existing test suite for the failing compiler. Control then proceeds to step 74 where a determination is made as to whether there are more test results to be examined. If there are more test results, control proceeds to step 64 to again begin examining the results of one of the test program executions.

At step 66 if a determination is made that there is no test failure, control proceeds to step 74 where the determination is made as to whether there are more test results. If more test results exist, one is selected and examined in step 64. If, at step 74, a determination is made that all test results have been examined, control proceeds to step 76 indicating completion of examination of test results.

The previous steps describe a general overall process for generating test programs and producing and examining results. In an example embodiment, the previously described differential testing technique, the general testing method described in FIG. 4 is also applied.

Figure 5A:
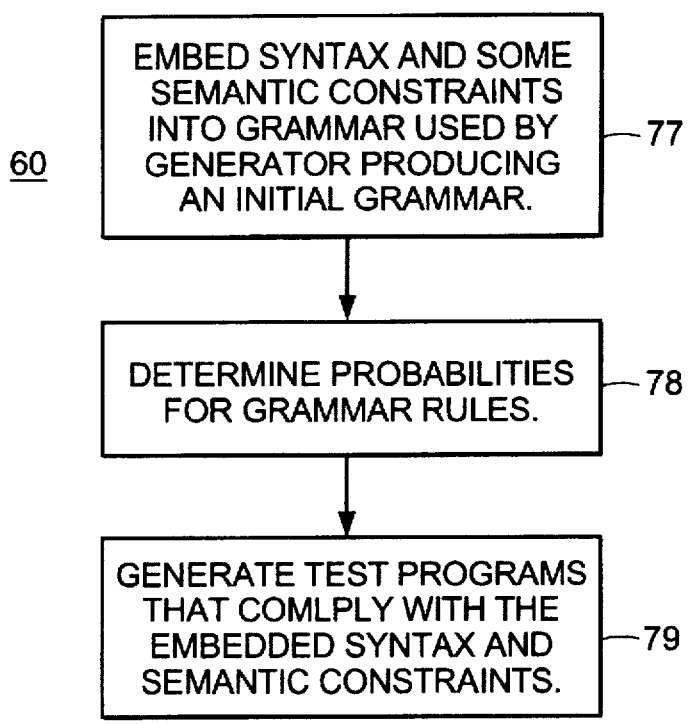
FIG. 5a is a flowchart showing an example embodiment of a method for generating a test program.

Referring now to FIG. 5a, an example embodiment of a more detailed description of generating a test program as described in step 60 of FIG. 4 is set forth. In step 77, an initial grammar is produced in which the initial grammar includes rules describing syntax and a portion of semantic constraints, for example, those included in a programming language standard. Generally, at step 77, a preferred embodiment includes as many syntactical and semantic constraints in the grammar as possible taking steps to ensure that a generated source program meets or conforms to as many constraints included in the standard as possible. When such a grammar is included in the test generator 33, the grammar generates programs which conform to these embedded syntax and semantic constraints.

One technique applied in performing step 77 to incorporate syntactic and some semantic constraints into a grammar included in test generator 33 uses a standard specified grammar, such as a "C" standard grammar described in the ANSI "C" standard. Generally, the technique builds upon a grammar, for example the "C" standard grammar, that includes only syntactic constraints. New rules are added and existing rules are modified to incorporate semantic constraints. By incorporating into a standard grammar these semantic constraints through grammar rule addition and modification, a better class of test programs can be generated using a grammar. In other words, by using a new or modified standard grammar, producing programs which are correct or conforming is greatly increased by minimizing the possibility of producing incorrect or nonconforming programs. The implication of using the new grammar means the test generator generates a minimal amount of non-conforming programs. However, it also means a much larger grammar includes many new grammar rules, as will be described in following text.

After including constraints into the grammar, control proceeds to step 78 where probabilities for the grammar rules are determined and associated with each respective grammar rule. At step 79 test programs are generated which comply with embedded syntax and semantic constraints incorporated into the grammar at step 77.

As specified in accordance with a standard such as the ANSI "C" standard, a conforming program satisfies runtime and non-runtime constraints. Non-runtime constraints include syntax and some semantic constraints. Generally, the non-runtime, syntax and semantic constraints can be embedded into the grammar. However, there are certain kinds of constraints, e.g., run time constraints, which cannot be embedded into the grammar as they cannot be determined until run time. In other words, in order to completely determine if a program produced by test generator 33 is standard conforming or correct, a run time determination must also be made after generation and compilation of the test program source code, and after execution of a resulting machine executable corresponding to the test program source code. This runtime determination is described in following text in conjunction with FIG. 5b.

Figure 5B:
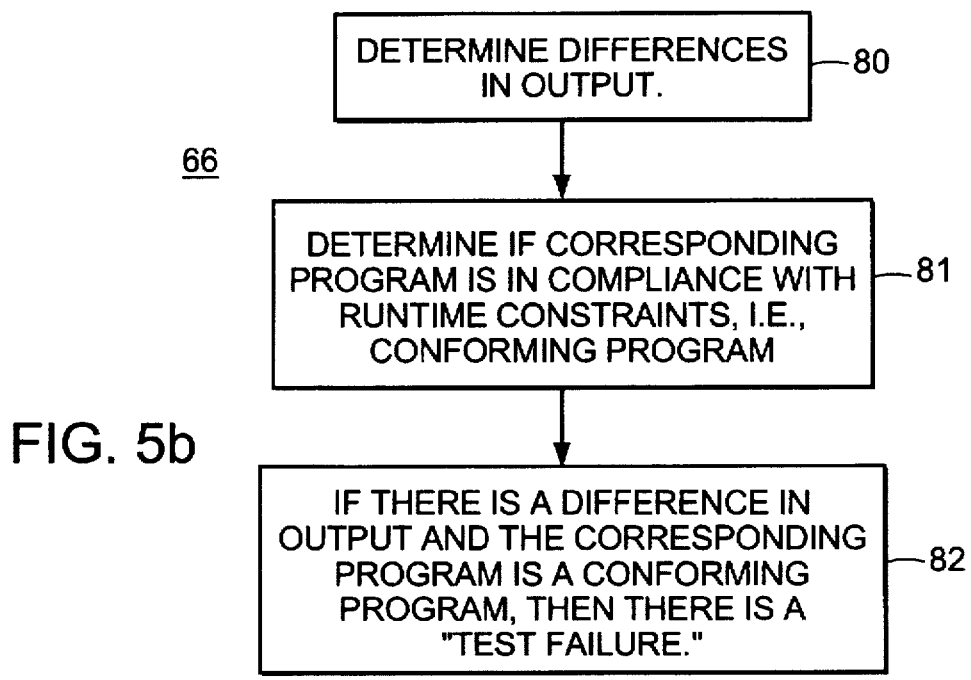
FIG. 5b is a flowchart showing an example embodiment of a method for determining a test failure.

Referring now to FIG. 5b, an example embodiment of a detailed description of one embodiment of step 66 of FIG. 4 is shown. The task of determining whether there is a test failure using the differential testing technique in the example embodiment of FIG. 5b includes several steps. Differences in output or results of executing a test program are examined at step 80 and a determination is made as to whether there are differences between various outputs. A determination is made at step 81 as to whether the program is in compliance with run time constraints. At step 82, if there is a difference in output and a corresponding program is deemed to be a conforming program in compliance with one or more run time constraints, then there has been a test failure.

Using the differential testing technique, a test failure has two formal requirements as determined by steps 80 and 81. If one of these conditions fails to hold, such as there is no difference in output or the corresponding program being tested is not in compliance with run time constraints, then there is deemed to be no test failure, as just described. The differential testing technique requires that a program be in conformance with a standard. In accordance with such a standard, if a program is not in conformance with non-runtime constraints, for example, syntactic and some semantic constraints, as well as run time constraints, any difference detected in output between various compilers, for example, does not indicate an error or test failure. In other words, standards such as the ANSI "C" standard typically only require equivalent behavior amongst standard compliant compilers when the input is standard conforming. Otherwise, the behavior of the compilers and machine executables produced using a non-conforming input are not required to be equivalent.

Given the foregoing description, an example use of the herein describe differential testing technique is to test two or more compilers. For example, two compilers are used at step 62. Each compiler is presumed to be ANSI "C" compliant and compile C source programs. Two language processors 34a and 34b of FIG. 1, such as compilers, reside in the same computer system 12a. The same source program is compiled by each of the compilers producing a corresponding object file. Each of the corresponding object files are then linked producing a corresponding machine executable. Both corresponding machine executables are executed and the run time behavior or output produced by executing each machine executable program is examined. A determination is made as to whether there is a test failure. A test failure is deemed to have occurred if there are both differences in output or runtime behavior, and if the source program is determined to be a conforming program in compliance with run time constraints specified in accordance with the programming language standard. If both of these foregoing determinations are true, then the corresponding program is deemed to be a conforming program and a test failure has occurred. Subsequently, the test is reduced such that it is the smallest possible test in the simplest form as determined in accordance with a test reducer used which will be described in following text such that a developer or maintainer which examines the test failure can more easily determine the test failure in accordance with the program which failed. The developer subsequently determines what actions to take in response to the test failure.

The foregoing description of the differential testing technique should not be construed as requiring that a conforming program be produced by a test generator. A conforming program can also be produced using many other techniques, such as manually entering a source program included in a file using a keyboard, terminal, and software editor. The technique of using a test generator to generate a test program used in the differential testing technique is one way of producing such a test program.

Figure 6A:
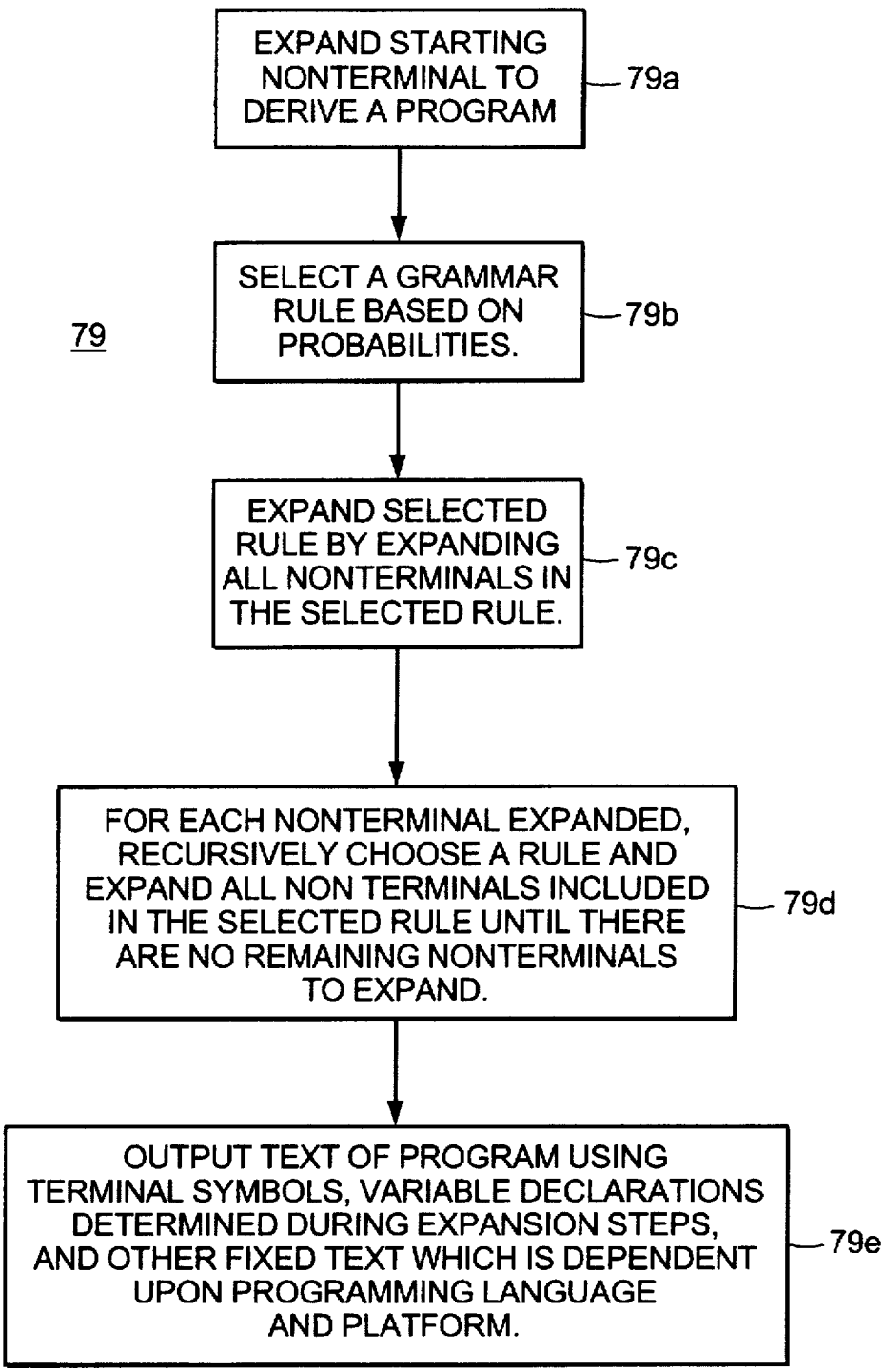
FIG. 6a is a flowchart showing an example embodiment of a method for generating test programs that comply with syntax and semantic constraints.

Referring now to FIG. 6a, an example embodiment of a method for generating test programs that comply with embedded syntax and semantic constraints, as in step 79 of FIG. 5a, will now be described. Generally, the steps of FIG. 5a which will now be described set forth what happens during the actual execution of the test generator 33 using a grammar which has embedded syntax and semantic constraints in order to generate a test program source code 50.

At step 79a, the starting nonterminal of the grammar is expanded to derive a program. At step 79b, a grammar rule having the starting nonterminal as the left hand side (LHS) of the grammar rule is selected based on probabilities or frequencies associated with each rule. The selected rule is further expanded as in step 79c by expanding all nonterminals in the right hand side of the selected grammar rule. At step 79d, for each nonterminal expanded recursively select a rule and expand all nonterminals included in the selected rule's right hand side (RHS) until there are no remaining nonterminals to expand.

At the end of execution of step 79a–79d, all nonterminals have been expanded to produce terminal symbols. By expanding each nonterminal until only terminal symbols remain, the body of the text of a program results, for example, programming language statements. At step 79e, the body of the program is output and included in the source code. Additionally, variable declarations as determined during foregoing expansion steps, and other predetermined text which is dependent upon the programming language and platform, may also be included in the generated source program such that the source program generated is a complete source program.

The overall method just described for FIG. 6a is equivalent to deriving a string from a grammar as described in conjunction with the previous example. In the instant case, the generated program includes a body of code which is the generated terminal string derived from grammar rules described in accordance with a predetermined programming language standard. The method steps described in conjunction with FIG. 6a summarize the execution of the test generator 33 as shown in FIG. 3 and FIG. 1 to produce a test program 50. Generally, the process involves expanding each nonterminal symbol and replacing it with the right hand side (RHS) of a grammar rule including terminal symbols and/or nonterminal symbols.

Figure 6B:
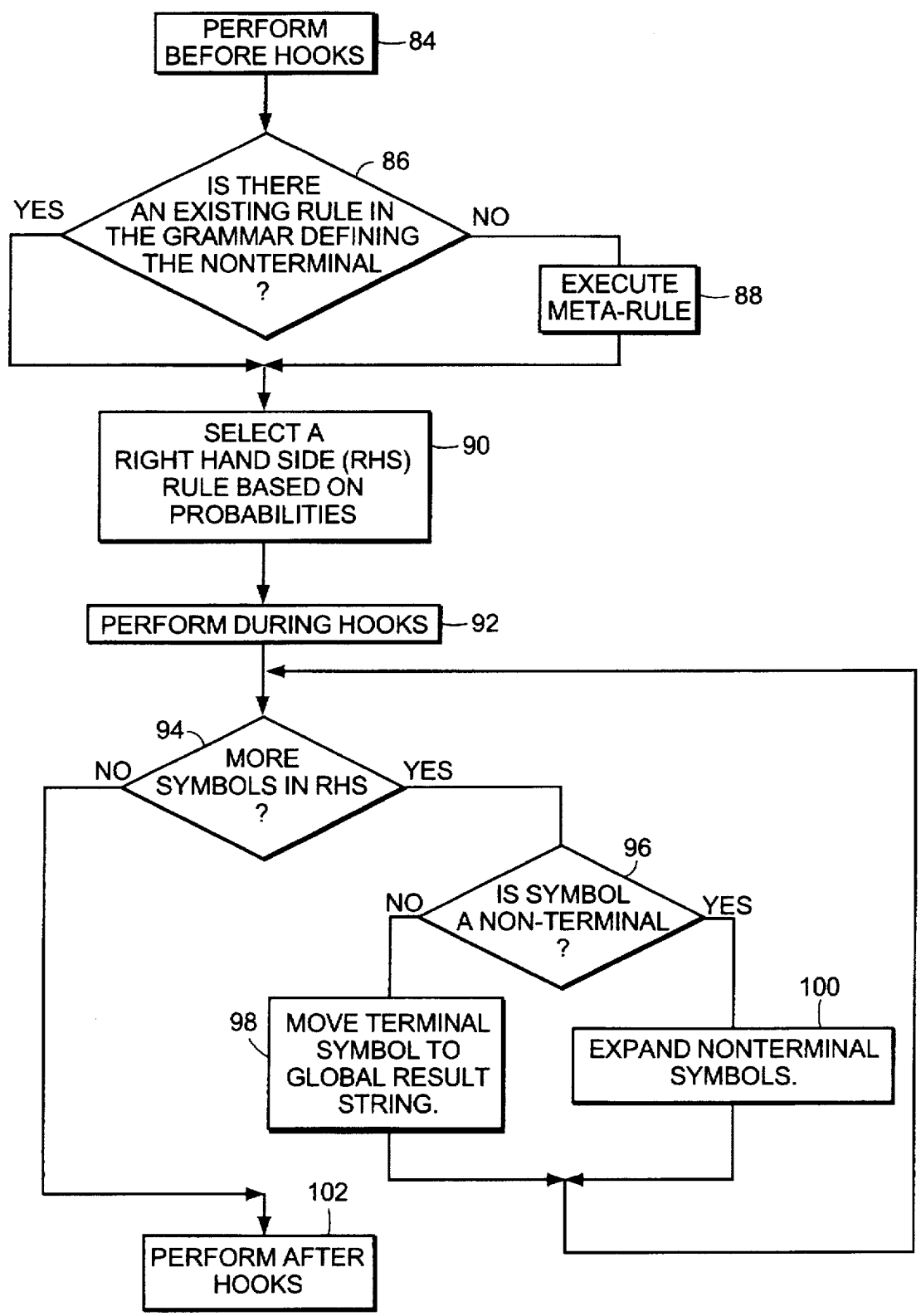
FIG. 6b is a flowchart showing an example embodiment of a method for expanding a nonterminal symbol during test program generation.

Referring now to FIG. 6b, an example embodiment of a method for expanding a nonterminal symbol during test program generation will now be described. The logic of the flow chart of FIG. 6b is typically included, for example, in a routine within the test generator 33. The expansion of a nonterminal begins by performing any BEFORE hooks at step 84. Generally, a "hook" is a process that, during test generation, performs additional semantic processing. As will be seen in following text, there are three types of hooks, BEFORE hooks, DURING hooks and AFTER hooks which are performed at different points in the expansion of a nonterminal symbol. It should be noted that each type of hook, as apparent by the name, is defined relative to its use in expanding a nonterminal. BEFORE hooks, as in step 84, are processed prior to choosing a right hand side rule for a nonterminal symbol being expanded.

In step 86 a determination is made as to whether there is an existing rule in the grammar defining the nonterminal currently being expanded. In other words, in the test generator, a determination is made as to whether there is currently a grammar rule which exists with the left hand side containing the nonterminal symbol currently being expanded with a corresponding right hand side rule. If a determination is made at step 86 that there is an existing rule in the grammar for the nonterminal, control proceeds to step 90 where a right hand side rule is selected based on probabilities previously determined. If at step 86 a determination is made that there is no existing rule in the grammar defining the nonterminal currently being expanded, control proceeds to step 88 where a meta-rule is executed.

Generally, a meta-rule is elaborates upon the existing grammar, for example, by filling in additional information and adding production rules, rather than perform additional semantic processing, like a hook. For example, in step 88, execution of a meta-rule may result in the addition of new rules to the grammar defining the nonterminal symbol previously determined in step 86 to have no such corresponding defining grammar rules.

At step 90, using assigned probabilities, the right hand side rule is selected for the current nonterminal symbol being expanded. After selection of a right hand side of a grammar rule corresponding to the current nonterminal being expanded, but prior to expanding the chosen right hand side, DURING hooks are performed as in step 92. Generally, a DURING hook contains processing steps to be performed which are dependent upon the rule chosen and required to be performed prior to expanding the nonterminal symbols of the chosen right hand side rule. Once a grammar rule is chosen, as previously described in conjunction with FIG. 6a, each nonterminal symbol within the right hand side is expanded. This repetitive recursive process is indicated in FIG. 6b by the loop formed beginning with step 94.

At step 94, a determination is made as to whether there are more symbols in the right hand side to be processed. Symbols within the right hand side can include nonterminal and terminal symbols. If there are more symbols in the right hand side to be processed, one is selected, and at step 96, a determination is made as to whether that symbol is a nonterminal. If it is determined that the symbol selected in step 96 is a nonterminal, it is expanded as in step 100. If a determination is made in step 96 that the symbol is not a nonterminal symbol, the symbol being processed is categorized, by process of elimination, as a terminal symbol.

At step 98, each terminal symbol is moved to a global result string. This global result string represents the concatenation of all terminal symbols resulting from the expansion of a nonterminal. In other words, each terminal symbol corresponds to a portion of the body of code included in the generated test program 50. After processing a symbol, control proceeds to step 94 where a determination is again made as to whether there are more symbols on the right hand side to be processed. As previously described, each symbol within the right hand side is processed until there are no longer any remaining symbols in the right hand side as determined by step 94. At this point, control proceeds to step 102 where AFTER hooks are performed.

An AFTER hook is generally performed after expansion of the right hand side being complete but prior to continuing process for program generation. For example, an AFTER hook may perform processing complementary processing previously performed in a BEFORE hook as in step 84.

Typically, BEFORE hooks, DURING hooks and AFTER hooks are implemented as routines which are called from an expand routine implementing the expand logic of FIG. 6b. Hooks can be used for many purposes. An example of the use of hooks will be described in following text in later portions of the specification.

Generally, in a preferred embodiment of the test generator 33, hooks used in the expansion of a nonterminal, as in FIG. 6b, are particular for each nonterminal being expanded. It should also be noted that the existence of BEFORE, DURING or AFTER hooks for a particular nonterminal are not required. In other words, a hook for a particular nonterminal may or may not be required and, therefore, may or may not exist. Thus, as an implementation consideration, the language used, for example, to implement the test generator should have a mechanism by which a call can be made to a routine if one exists. However, there is no guarantee that a routine will exist.

For example, if the test generator 33, and in particular hooks, were implemented in the "C" programming language. Hooks may be implemented using a table with pointers to functions. A table is initialized with functions or routines to be called in which each function or routine included in the table corresponds to a hook routine for a particular nonterminal. If an entry within the table does not contain a function name, then no hook corresponds to that particular nonterminal and, therefore, no hook routine is called or performed when expanding that corresponding nonterminal. Typically, a runtime determination within the expand routine is made to test if a particular entry in the table is empty, then no hook routine is called.

Note that an embodiment may contain a common hook routine for more than one nonterminal and an embodiment may also contain a hook routine for each nonterminal. However, a preferred embodiment typically will not contain common hook routines, and typically will not contain a BEFORE, DURING and AFTER hook routine corresponding to each nonterminal symbol.

As previously described, hooks are classified and named in accordance with their position within the expansion of a nonterminal. The table below summarizes the effect and inputs typical of an example embodiment of each type of hook routine:

LHS=function of BEFORE hook (LHS)
RHS=function of DURING hook (LHS,RHS)
Body of program=function of AFTER hook (LHS, RHS, Body of Program)

In the above table, LHS stands for left hand side of a grammar rule, RHS stands for right hand side of a grammar rule, and "body of program" corresponds to the terminal symbols produced thus far during the expansion of nonterminals as included in the body of the resulting generated test program. Generally, a BEFORE hook affects, for example by modifying, the left hand side of a grammar rule. Recall that a BEFORE hook is executed prior to choosing a particular rule with a particular right hand side corresponding to a nonterminal symbol being expanded which in the foregoing table is designated LHS.

Generally, a DURING hook affects the right hand side of a grammar rule. The DURING hook routine typically takes as input(s) the left hand side and/or the right hand side of a particular grammar rule, and in turn, affects, for example by modifying, the right hand side of a grammar rule or rules corresponding to the nonterminal symbol on the left hand side being expanded.

Generally, AFTER hooks change the body of the program or a string of terminal symbols currently produced during the expansion of the left hand side or nonterminal symbol, or modify something from a previous hook. Processing steps, as during program generation, performed by an AFTER hook typically depend upon any combination of the following three inputs: the left hand side nonterminal symbol being expanded, the right hand side rule chosen and the string of terminal symbols denoted body of program currently derived from expanding the current nonterminal symbol.

A meta-rule, as used in step 88, is generally implemented as a routine which is called upon determining in step 86 that there is no existing rule in the grammar defining a current nonterminal symbol being expanded. In other words, the primary purpose of the meta-rule is to add rules to the existing grammar defining the nonterminal symbol currently being expanded. Examples of both hooks and meta-rules are described in following paragraphs of the specification.

Generation of a test program using the grammar, hooks and meta-rules previously described generally involves producing an initial static grammar which is then dynamically modified or augmented during the expansion of the nonterminals as described in step 79 and as is demonstrated by the logic of FIG. 6b.

Figure 7:
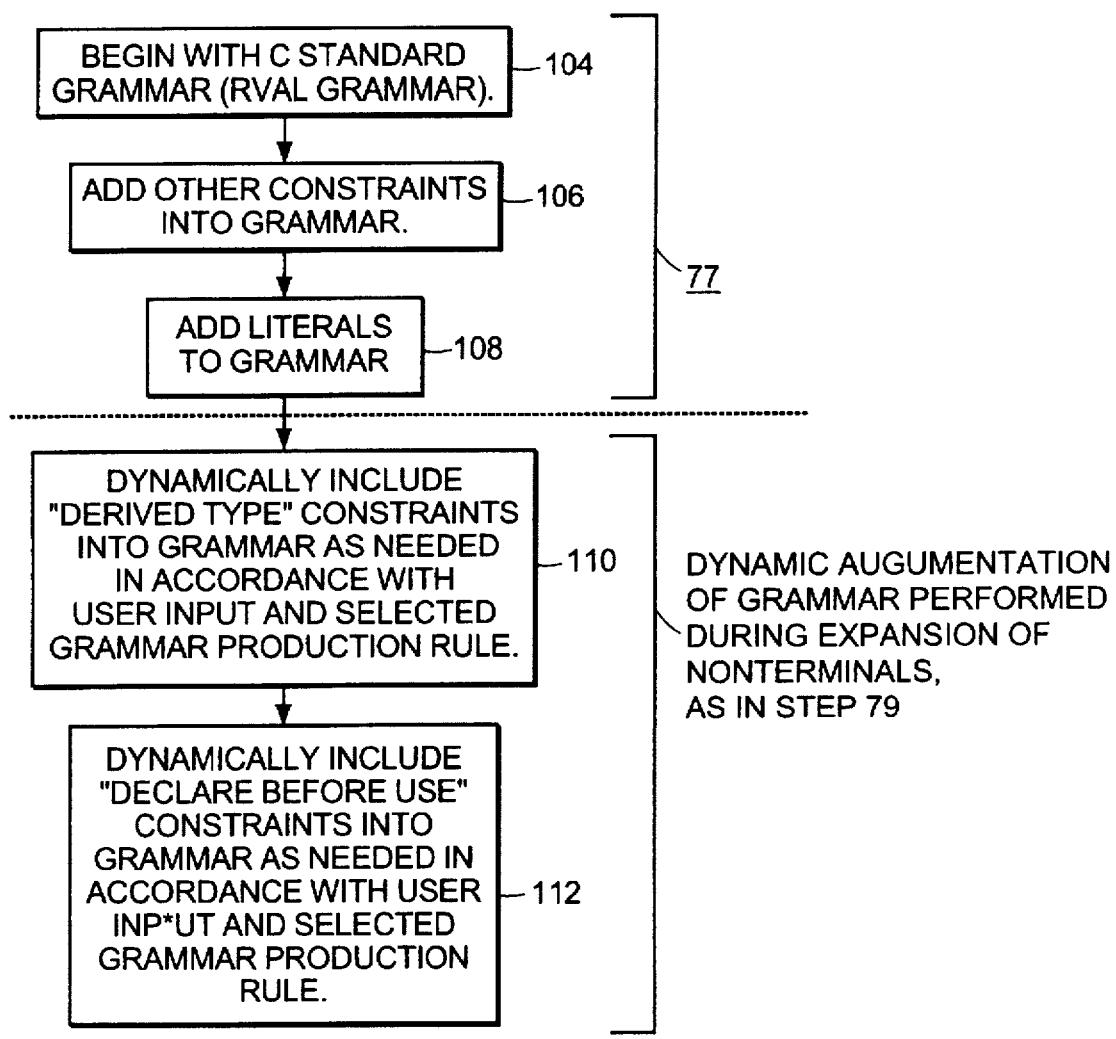
FIG. 7 is a flowchart showing an example embodiment of method for producing an initial grammar which is dynamically augmented during expansion of nonterminal symbols.

Referring now to FIG. 7, an example embodiment for a method of generating a grammar used in the test generator 33 is shown. As previously mentioned, the grammar is generally built in two pieces. An initial grammar is statically produced prior to test program generation. This initial grammar is dynamically modified as needed during the nonterminal expansion process. Steps 104, 106 and 108 are more detailed steps of step 77 previously described in conjunction with FIG. 5a in which syntax and some semantic constraints are embedded into a grammar prior to test generation to form the initial grammar.

The dashed line included in FIG. 7 separating steps 108 and 110 indicates the division of steps which are performed statically in establishing an initial grammar, and those steps 110 and 112 which dynamically augment the initial grammar during the expansion of nonterminals when the test generator 33 is executed. Steps performed in producing the initial static grammar are above the dashed line, and those steps dynamically modifying the initial grammar are below the dashed line. Generally, steps 104, 106 and 108 are performed at some time prior to executing the test generator to generate a test program. When a test program is generated by executing the test generator 33, steps 110 and 112 below the dashed line are performed as needed depending upon which rules are selected in accordance with their associated probabilities in the grammar.

In obtaining the body of the program or the text of terminal strings produced during the expansion of a nonterminal symbol, several techniques can be used, as in previously described step 98 of FIG. 6b. An example technique uses a global string declaration in which terminal symbols are added during the expansion process. In other words, examination of the global string during any point of the expansion process reveals all terminal symbols resulting from the expansion of nonterminal symbols processed thus far during test program generation.

Another technique, as recognized by those skilled in the art as being dependent upon implementation language chosen for the test generator 33, uses a return stack mechanism built into recursive process of FIG. 6a previously described in expanding nonterminals. In other words, in the expansion process, an expand routine is recursively called with different nonterminal symbols to expand. Use of the return stack mechanism returns, for example, the resulting text string of terminals associated with the expansion of a particular nonterminal as a routine parameter upon completing expansion the particular nonterminal. Using the return stack mechanism, a text string or body of the program is constructed by concatenating each returned string from the prior or lower levels of recursiveness. This is a standard technique known to those skilled in the art in implementing, for example, a recursive descent processing technique.

Referring again to FIG. 7, in step 104 one method of producing an initial grammar begins with using a grammar as defined in accordance with a programming language standard. Generally, this grammar is used in syntactic program recognition in compilers and includes syntactical constraints but does not include semantic constraints. In step 106 other constraints, such as those semantic constraints described in the text of the ANSI "C" standard, are included in the grammar by adding additional rules and expanding existing grammar rules. In step 108 literals are added to the grammar. An example of a literal, as will be described in following text is an integer literal constant, e.g., "99999", or a floating point constant, e.g., "3.1478".

At the conclusion of step 108 an initial grammar has been produced. One technique for implementing the grammar is to store the rules produced from steps 104, 106 and 108 in some kind of a table formation or data structure with left hand side nonterminals and corresponding right hand side rules. Using this mechanism for a table, given a particular left hand side nonterminal symbol, a corresponding list of the right hand side rules can be easily determined. Note that an embodiment may include other mechanisms for storing the grammar rules.

At this point the initial grammar included in the test generator 33 is built and remains stagnant or static until the test generator is invoked indicating a test program is to be generated. Upon invocation of the test generator beginning with the starting nonterminal symbol in the grammar, various right hand side rules are chosen in accordance with associated frequencies or probabilities as part of the expansion process previously described in FIGS. 6a and 6b. During that expansion process, steps 110 and 112 may be performed dependent upon the particular grammar rules chosen. A chosen or selected rule may include a derived type. A derived type, as defined in accordance with the standard is generally a type of an identifier or other language element which is constructed or based upon another type. For example, in "C", an array is a derived type based upon elements or objects of another type, such as integer. Other derived types within the ANSI "C" standard, as known to "C" programmers, include a structure, a union, a function and a pointer. Each of these derived types is defined inter terms of another type. An example of how derived type constraints are dynamically included into the grammar as needed in accordance with user input and selected grammar production rules is explained in more detail in following paragraphs.

Another way in which the initial grammar may be dynamically augmented or modified is to include "declare before use" constraints, as in step 112. Generally, "C" is a "declare before use" language in which, prior to using a variable or identifier, that identifier must be declared. Thus, step 112 includes dynamically modifying the grammar to include a declaration as needed depending upon the rule selected during the expansion. An example of how the declare before use constraints are dynamically incorporated into the grammar as needed is explained in more detail in conjunction with the following text and figures.

Figure 8:
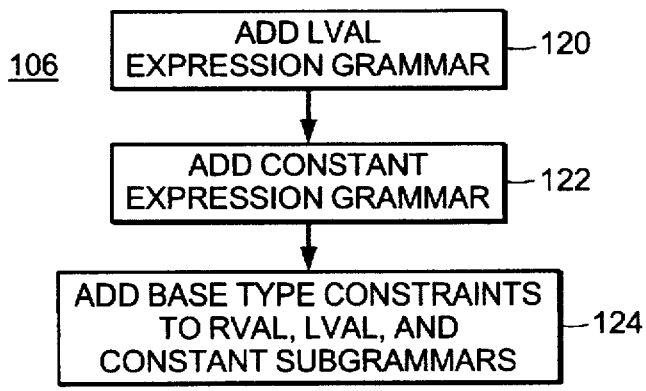
FIG. 8 is a flowchart showing an example embodiment of a method for adding constraints into an initial grammar.

Referring now to FIG. 8, an example embodiment of a method for adding other constraints into the grammar as described in conjunction with step 106 will now be described. Generally, to include semantic constraints into the initial grammar, a standard syntax grammar (for example as defined in the "C" standard) is analyzed in terms of constants, nonconstants, LVALs and RVALS. Thus, embedding semantic constraints specified in the text of the ANSI "C" standard into the standard syntax grammar includes incorporating LVAL restrictions, constant expression restrictions and additional RVAL restrictions.

As defined in the C standard, an LVAL (or "L-VALUE") is generally an expression that designates an object. Originally, the name L-VALUE comes from the assignment expression in which L-VALUE represents a modifiable value on the left hand side of an assignment expression of the form E1=E2 (Note: E1 and E2 are expressions. E1 is the LVAL expression). What is sometimes termed an RVAL (or "R-VALUE") as described in the "C" standard is generally referred to as the value of an expression or the right hand side of an assignment expression of the form E1=E2. Incorporating LVAL and RVAL semantic constraints involves examining expressions as defined in the "C" standard since LVAL and RVAL are generally expressions which appear respectively on the left hand side or the right hand side of an assignment statement. Generally, the "C" standard grammar syntactically defines LVALs in using RVALs. Generally, an expression is a sequence of operators and operands that specifies a computation. As known to those skilled in the art of programming, an expression may result in a value and may cause side effects. Precisely how an expression, if any, is defined depends upon the programming language for which the test generator 33 is generating test programs 50. Hereinafter, those grammar rules describing an expression in a version of the ANSI "C" programming language standard are referred to as the "RVAL expression grammar" or "RVAL grammar".

To add LVAL constraints as specified in the ANSI "C" standard, a parallel grammar for the LVAL expression needs to be included into the initial grammar. In other words, the existing RVAL expression grammar is duplicated and modified as needed to express precisely the LVAL expression grammar as in step 120. As previously mentioned, an expression can also be a constant or a nonconstant expression, in addition to an expression being either an RVAL or LVAL type expression. Thus, as previously done in step 120, a parallel expression grammar is added to include constraints for constant expressions.

Within parallel expression grammars, as for LVAL and constants, the base type constraints need to be incorporated within each of these parallel grammars as in step 124. Generally, a base type within a programming language is defined as a basic type which may be used as a building block, for example, to produce another type, such as derived types. For example, in the C programming language signed integer denoted "int" within the syntax of the "C" language, is a base type. This base type is used to define other types such as a derived type. An example of the derived type is an array. In "C", for example, a variable can be declared which is an array of integers. Generally, a derived type is derived or based upon a base type which is a primary type defined within the programming language. For example, ANSI "C" generally describes 13 base types, such as signed integer and unsigned integer, upon which derived types, such as arrays, are built. Incorporating base type constraints, for example, includes defining an RVAL, an LVAL and a constant expression for each type. Details of steps 120, 122 and 124 will now be described in more detail. Note that the following paragraphs describe one particular method for adding parallel expression grammars particular to ANSI "C". As will be recognized by one skilled in the art, other methods can also be used in an embodiment of the test generator 33.

Figure 9A:
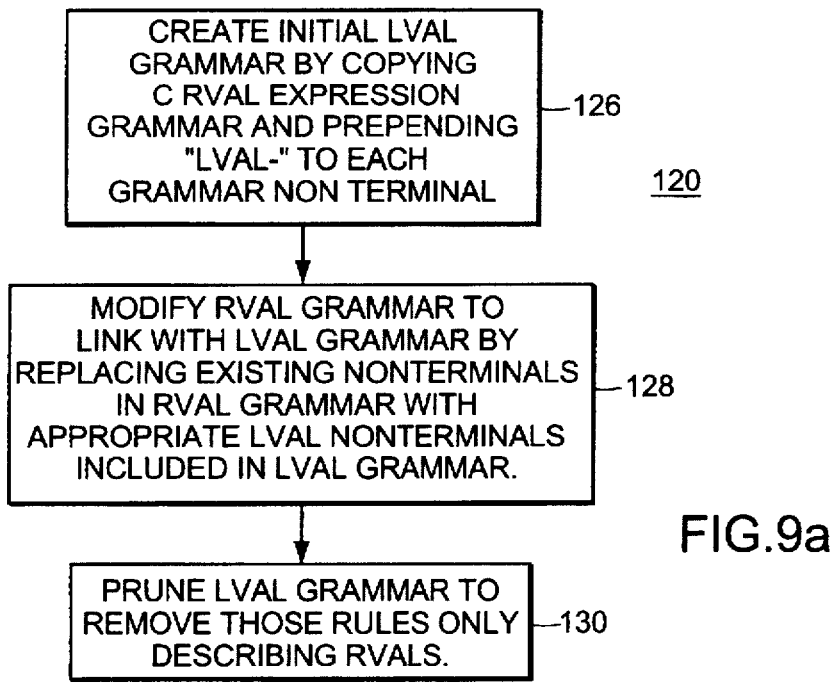
FIG. 9a is a flowchart showing an example embodiment of a method for adding an LVAL expression grammar into an initial grammar.

Referring now to FIG. 9a, an example embodiment of a method of adding an LVAL expression grammar into an existing grammar to form an initial grammar is set forth and will be described. An initial LVAL grammar is created by copying the "C" RVAL expression grammar and prepending "lval-", or some other unique string corresponding LVAL, to each grammar nonterminal at step 126 denoting these nonterminal symbols as LVAL expression grammar nonterminals. The existing RVAL expression grammar is subsequently linked (or "connected") to the new parallel LVAL expression grammar by replacing existing nonterminals in the RVAL expression grammar with the appropriate LVAL nonterminal included in the initial LVAL grammar as in step 128. In step 130, the LVAL expression grammar is modified to remove those rules which only describe RVALs. In other words, rules are removed from the parallel LVAL expression grammar which are inappropriate for describing LVALs.

Overall step 126 creates a new parallel LVAL expression grammar. Step 128 alters the original "C" RVAL expression grammar to link in the new LVAL expression grammar produced from step 126. Step 130 "prunes" (or "removes") those rules from the LVAL grammar created in step 126 which are unnecessary to describe LVAL constraints.

Generally, the RVAL expression grammar links (or "connects") to the LVAL expression grammar in three places: assignment operators, e.g., a=b, increment and decrement operators, e.g., a++, and the "address of" operator (denoted "&" in the "C" language), e.g., p=&x.

Steps 126, 128 and 130 can be automated by use of a program which reads in the existing RVAL expression grammar and outputs an initial LVAL grammar by prepending a unique string, such as "lval-" to each grammar nonterminal. The precise semantics of step 128, which involves modifying the RVAL grammar to link in the parallel LVAL grammar, is found within the text of the ANSI "C" standard. The three particular instances where the RVAL and LVAL grammars need to be connected were previously described. As an example of a modification to an existing rule in the RVAL grammar to link in the LVAL grammar, examine the following grammar rules.

original rule in RVAL C expression grammar:

<assignment-expression>→<unary-expression><assign-op><assignment-expression> modified original rule:

<assignment-expression>→<LVAL-unary-expression><assign-op><assignment-expression>

The original rule from the RVAL expression grammar which is modified involves the assignment statement or the assignment operator. In the ANSI "C" standard what is denoted <unary-expression> in the above original rule can only be an LVAL unary expression. Therefore, the original rule is modified as noted above in bold typeface.

Figure 9B:
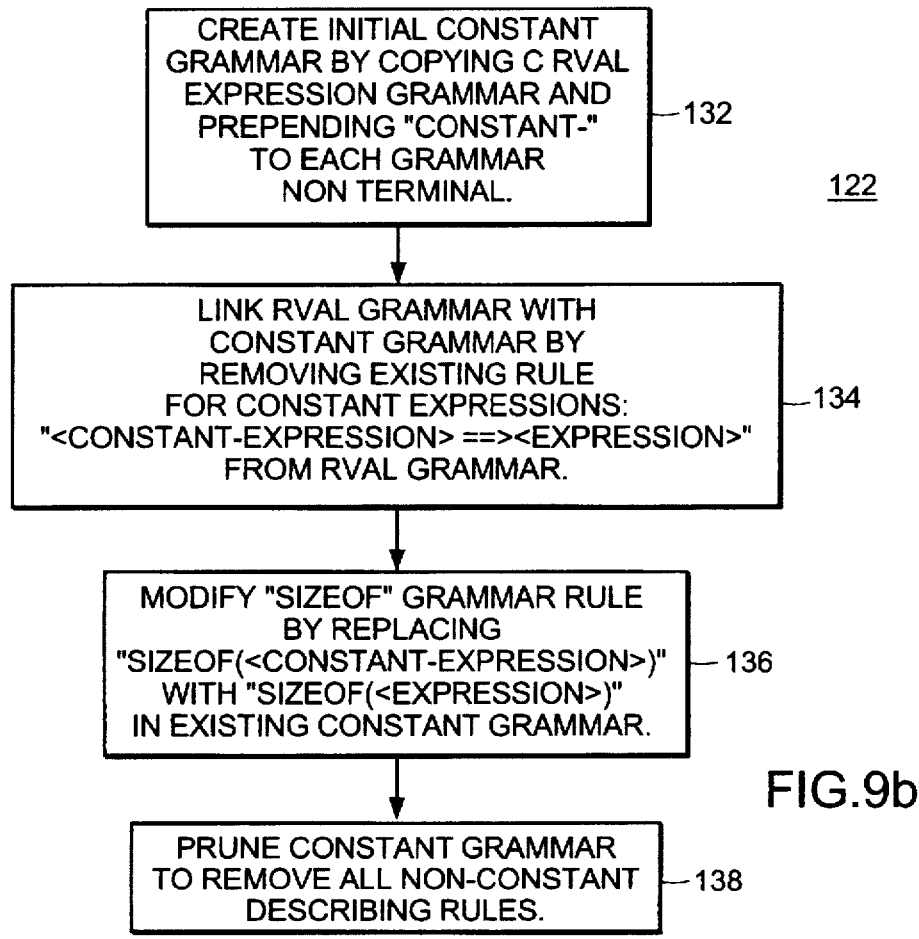
FIG. 9b is a flowchart showing an example embodiment of a method for adding a constant expression grammar into an initial grammar.

Referring now to FIG. 9b, an example embodiment of a method for adding a constant expression parallel grammar, as at step 122, will now be described. At step 132 an initial constant expression grammar is formed by copying the RVAL expression grammar and prepending "constant-", or another unique string denoting constant expression, prior to each grammar nonterminal. This step is similar to step 126 as previously performed for the LVAL expression grammar formation. At step 132, each grammar nonterminal prepended with a unique string denotes that the grammar nonterminal defines a nonterminal symbol in the constant expression grammar.

The existing RVAL grammar is subsequently linked (or "connected") with the parallel constant grammar created from step 132. This linking is done by removing the existing rule for constant expression which recursively defines a constant expression in terms of an expression. By removing this recursive rule, the nonterminal <constant-expression> is now defined in accordance with our newly created parallel constant expression grammar. In other words, a new more restrictive definition for constant expression is now supplied rather than the recursive definition for constant expression as previously supplied.

In step 136, the sizeof grammar rule within our newly created constant expression grammar is modified by replacing "sizeof <constant-expression>" with "sizeof <expression>". This is a cross-over point within the constant grammar linking it back with the RVAL expression grammar. In step 138 the newly created constant grammar is pruned to remove all constant describing rules.

Note that precisely what rules from the constant grammar are removed can be found within the ANSI "C" standard text. For example, an existing ANSI "C" standard specifies that there are constant expressions in the following locations: a constant for a "C" case statement selector, e.g., case 3:, a constant for the size of an array bounds, e.g., int a [3], a constant for a global initializer declaration, e.g., int a=3, a specifier for the width of a bit-field, and a value of an enumeration constant in an enumeration declaration. NOTE: The foregoing "C" language constructs will be recognized by those skilled in the art of "C" programming. In other words, the text of the "C" standard, when describing the foregoing items, specifies that these are the instances where constant expressions are allowed. Thus, the text of the standard identifies these as cross-over or linkage points for connecting the RVAL and constant expression grammars as used in conjunction with step 134.

Figure 9C:
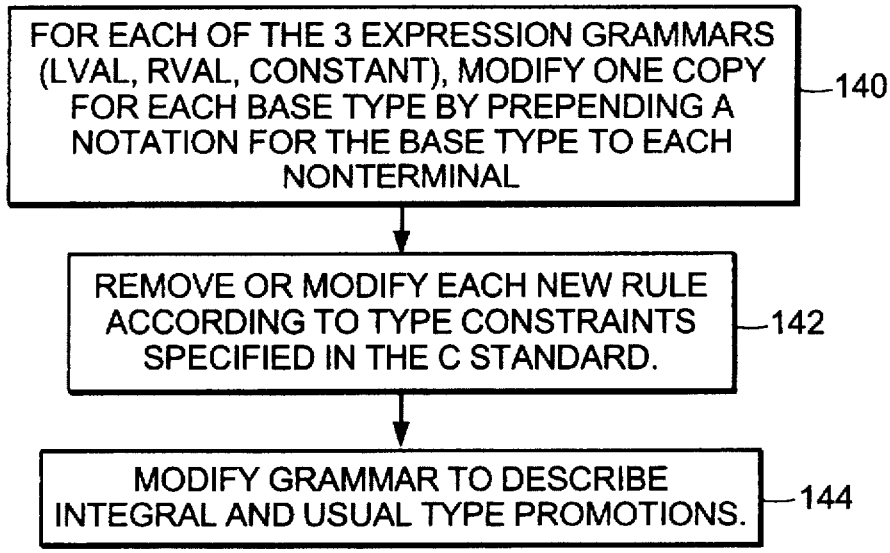
FIG. 9c is a flowchart showing an example embodiment of a method for adding base type constraints into an initial grammar.

Referring now to FIG. 9c, an example embodiment of a method for adding base type constraints into the parallel RVAL, LVAL and constant expression grammars as in step 124 of FIG. 8 is set forth. Generally, as previously mentioned, in accordance with the ANSI standard, 13 base types are defined as included in the "C" language. These types are signed character, unsigned character, short, unsigned short, integer, unsigned integer, long, unsigned long, float, double, long double, and void.

Programming languages can include type promotion rules. In the ANSI "C" programming language standard, base type constraints include integral and usual promotion and other type constraints derived from reading the text of the ANSI "C" standard. This will be described in more detail in following text.

For each of the base types previously mentioned, one copy of each of the three expression grammars, LVAL, RVAL and constant expression, is made as in step 140. The copy of each of these expression grammars is modified, one per base type, by prepending a notation for the base type to each nonterminal. For example, for the base type signed integer, a notation of the characters "si" can denote the signed integer type. In accordance with step 140, "si-" is prepended to each nonterminal for each of the three expression grammars LVAL, RVAL and constant expression. Note that this process is similar to the steps previously described to form the constant and LVAL expression grammars.

In step 142 each new rule in the parallel expression base type grammars are pruned (or "modified" or "removed") in accordance with the type constraints specified in the "C" standard for that base type. Again, these additional type constraints are found by reading the text of the "C" standard.

Consider the following example below:

1. Original RVAL grammar rule:

<mult-exp>→<mult-exp>%<cast-exp>

2. Modified RVAL grammar rule for signed integer (si-):

<si-mult-exp>→<si-mult-exp>%<si-cast-exp>

3. Modified RVAL grammar rule for floating-point (fp-):

<fp-mult-exp>→<fp-mult-exp>%<fp-cast-exp>

Shown above are three grammar rules, the first being the original RVAL grammar rule from the RVAL expression grammar. The second grammar rule is the resultant grammar rule after applying step 140 to the original RVAL grammar rule for the signed integer type denoted "si-" in the nonterminal symbols. Similarly, the third grammar rule is the original RVAL expression grammar rule modified in accordance with the base type floating point denoted "fp-" in the nonterminal symbols above. The text of the "C" standard states that operands for the remainder operator, included in the "C" language as percent("%") operator, cannot be floating point operands. Thus, applying step 142 the third grammar rule for floating point types would be removed from the base grammar added for the floating point data type since such a rule is not needed to describe the constraints of the remainder operator as applied to operands of type floating-point.

In step 144 the newly created grammars for each base type are modified to describe any integral and usual type promotions, as previously mentioned. An integral promotion is generally the upgrading of a base type which is of a size smaller than integer to the integer data type. Short is an example. When using a short integer type, for example, as in performing a mathematical operation, the short integer data type is upgraded to the integer ("int") data type prior to performing the mathematical operation. The grammar rules express this upgrade or usual promotion by including additional grammar rules and modifications to grammar rules as needed for each base type.

As an example of this integral promotion, consider the following example:

1. <si-factor>  →<short-factor>
2.              →<unsigned-char-factor>
3.              →<char-factor>
4.              →<unsigned-short-factor>

The foregoing example is a sample of rules specified which upgrade a type of signed integer for a factor nonterminal as can be used in deriving a string representing a mathematical expression. Promotion rules are added in accordance with the standard, for example, to upgrade unsigned character in short to the signed integer data type when appearing in a mathematical expression.

Another type of data type promotion which must be expressed in the grammar rules is called a usual promotion. Generally, this is described in the ANSI "C" standard as a "data type leveling" when an expression includes mixed data types. Data type levelling is generally applicable when an expression includes a variety of data types and each of these variety of data types are transformed to one common data type. For example, when adding an integer to a floating point number, a "C" compiler which is ANSI "C" compliant promotes the integer data type identifier or variable to a corresponding item of the floating point data type prior to performing the addition operation. In order to describe these type promotions, the initial grammar includes rules such as follows:

1. <fp-term> →<si-term>
2. →<ui-term>

(NOTE: "si" corresponds to signed integer "C" data type; "ui-" corresponds to unsigned integer "C" data type; "fp-" corresponds to the floating point "C" data type)

The foregoing example expresses the constraint that a floating point term, as used within a mathematical expression, can be a promoted signed and unsigned integer term. Note, however, that there would not be a grammar rule expressing a promotion from a double data type to an integer since the "C" standard includes no such usual promotion rules within its text.

In summary, a parallel expression grammar is added for each base type for each of the expression grammars thereby adding 39 new subgrammars or parallel expression grammars for the base types as defined in "C". The precise number of expression grammars needed and additional promotion rules vary with programming language and corresponding standard.

In addition to expressions, the ANSI "C" standard describes a class of entities referred to herein as "constant literals" or "literals". Generally, the "C" standard refers to floating constants and integer constants, for example, which represent the constant literals of varying data types. The rules given in the "C" standard generally define what can comprise an integer constant, for example, within the text of the standard. However, no grammar rules are precisely given within the standard describing what comprises a literal. In the text which follows in order to distinguish these constant literals from the previously described constant expressions, the term "literal" will be used to describe constant literals which are not expressions.

Figure 10A:
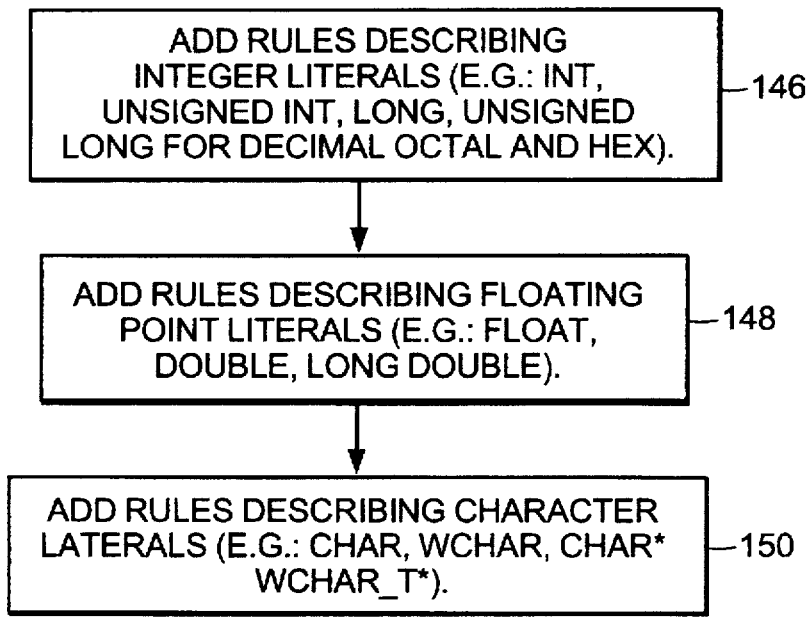
FIG. 10a is a flowchart showing an example embodiment of a method for adding literals into an initial grammar.

Referring now to FIG. 10a, an example embodiment of a method of adding literals to the grammar, as previously described in conjunction with step 108 of FIG. 7, is set forth. In step 146, grammar rules are added to describe integer literals. An integer literal is defined in the "C" standard as an integer, an unsigned integer, long or unsigned long data types. Additionally, the standard defines integer literals as taking the form of either a decimal, octal or hex string of one or more digits. At step 148 grammar rules are also added describing floating point literals. A floating point literal is defined as a float double or long double data type. In step 150 rules are added describing a class referred to herein as "character literals". A character literal includes those language elements in which a data value represents one or more characters. A character literal includes the following standard defined language elements: an integer character constant, a wide character constant, a character string literal, and a wide string literal.

When performing step 146 to add rules describing integer literals, the "C" standard describes precise nonoverlapping numeric ranges for the integer data types which may be expressed as a decimal, octal or hexadecimal literal. Note as applied to the description of literals or constant literals, "integer data type" refers to the previously stated base types of signed integer, unsigned integer, long and unsigned long. Additionally, note that each particular range corresponding to a type for a constant varies with programming language and programming language standard. For example, below are the rules as defined in accordance with the ANSI "C" standard defining numeric ranges corresponding to a particular integer data type.

TABLE 1

| nonterminal | inclusive range |
|---|---|
| <si-decimal-digits> | 1:INT_MAX |
| <sl-decimal-digits> | INT_MAX+1:LONG_MAX |
| <ul-decimal-digits> | LONG_MAX+1:ULONG_MAX |
| <si-octal-digits> | 0:INT_MAX |
| <ui-octal-digits> | INT_MAX+1:UINT_MAX |
| <sl-octal-digits> | UINT_MAX+1:LONG_MAX |
| <ul-octal-digits> | LONG_MAX+1:ULONG_MAX |
| <si-hexadecimal-digits> | 0:INT_MAX |
| <ui-hexadecimal-digits> | INT_MAX+1:UINT_MAX |
| <sl-hexadecimal-digits> | UINT_MAX+1:LONG_MAX |
| <ul-hexadecimal-digits> | LONG_MAX+1:ULONG_MAX |

In the above table, the following notation is used: "si" for signed integer data type, "sl" for signed long integer data type, "ul" for unsigned long integer data type, and "ui" for unsigned integer data type. Depending on the indicated digit format, for example hex, octal or decimal, and the value of a literal, the literal may be mapped to a distinctive nonterminal symbol. For example, in the above table nonterminal symbols are listed in the left hand column. In the right hand column is an inclusive range defined for the value of a particular literal. The value of the literal combined with whether the designation of the value is written in decimal, octal or hexadecimal enables a precise mapping to a constant nonterminal symbol. Note that in the above table INT_MAX, LONG_MAX, ULONG_MAX and UINT_MAX are defined in accordance with the "C" standard and merely represent an integer value or quantity designating the largest or maximum number of a particular data type. Ways to denote the particular format, for example octal, are apparent to those skilled in the art of "C" programming.

One technique used to construct grammar rules representing all literals within a language, for example, such as the "C" language use a unique mapping such as the foregoing included in Table 1. The unique mapping enables a classification of a particular literal into a particular literal type. In the foregoing table the value of the literal and the typing notation of whether the literal is a decimal, octal or hexadecimal literal, determines the literal type and hence the nonterminal mapping for a literal.

Referring now to FIG. 10b, an example embodiment of a method for defining grammar rules for integer literals is set forth. Numeric ranges for literals are defined, as in step 152. The numeric range can be represented as "a" through "b" (a–b) where "a" is less than or equal to "b" (a<=b). As in the above table, in the "C" programming language for integer literals, each range is unique for each type of integer literal.

In step 152 for the above range defined for a particular literal type, where a literal type is represented by a nonterminal symbol on the left in the existing grammar rules, a subgrammar is defined. The form of a grammar known to those skilled in the art as previously discussed includes nonterminal symbols, terminal symbols and grammar rules. Thus, for each of the above nonterminal symbols in the left hand column corresponding to a literal type, a subgrammar is defined by defining a set of nonterminal symbols (LHS portion of grammar rules), corresponding RHS grammar rules, and terminal symbols. For each of the above ranges, a set of nonterminal symbols is determined. The set of nonterminal symbols includes defining one nonterminal symbol for each pair of numbers within a range.

For example, if the numeric range defined for <si-decimal-digits> is 1–4, the set of nonterminal symbols defined in accordance with step 154 would include all possible combinations of digits 1 and 4 or 16 nonterminal symbols. The set of nonterminals represents the set of all possible left hand sides of the grammar rules.

In step 156 right hand side of the grammar rules for each nonterminal are defined. One method for doing this is more precisely described in conjunction with FIG. 10c in immediately following text. In step 158 rules are added to the initial grammar describing the limit or range of the values for the literal using the nonterminals and the RHS of the grammar rules.

Referring now to FIG. 10c, an example embodiment of a method of defining the right hand grammar rules for each nonterminal as in step 156 is set forth. A nonterminal symbol included in the set of nonterminal symbols generated as a result of performing step 154 is of the form <m–n> where "m" and "n" each represent a pair of numbers from within the range for a particular literal type. At step 156a a determination is made as to whether "m" and "n" are equal. If "m" and "n" are equal, control proceeds to step 156b where one right hand side rule is added to the grammar rules. For example, for a nonterminal symbol <m–n>, the terminal symbol "m" (or "n", since "m" equals "n"), is added as a RHS of a grammar rule for the nonterminal symbol <m–n>. If a determination is made of step 156a that "m" and "n" are not equal, control proceeds to step 156c where two RHS of grammar rules or productions are added for the nonterminal <m–n>. One right hand side rule is the terminal symbol m, the other is a nonterminal symbol of the form <m+1–n> (EG: m=4, n=5, <5—5> added as other RHS of grammar rule.

Below is an example illustrating the application of steps 152, 154, 156 and 158 for a numeric range defined for one hypothetical type of literal. For example purposes, this is not defined in accordance with any standard but to more clearly illustrate the foregoing technique of generating grammar rules for literals:

range=1–3 set of nonterminal symbols:    <1 – 1> <1 – 2> <1 – 3>
   <2 – 1> <2 – 2> <2 – 3>
   <3 – 1> <3 – 2> <3 – 3>

Grammar rules:

<1 – 1> →1
<2 – 2> →2
<3 – 3> →3
<1 – 2> →1
   →<2 – 2>
::

Range of values
<si-decimal-literal>→<1–3>

In the foregoing example, a numeric range of 1–3 is chosen for illustrative purposes for applying the method steps 152–158. Applying step 154 for the range defined 1–3 set of 9 nonterminal symbols above is produced. Performing step 156 defines right hand grammar rules for each of the nonterminals. Finally, applying step 158 defines a range of values denoted by the nonterminal <si-decimal-constant> with the right hand side rule of the terminal 1–3. The above grammar rules generated from step 156 and step 158 would define precisely a signed integer decimal constant.

Below is another example further illustrating the application of step 158:

<si-decimal-literal>  →<1 – 9>
  →<1 – 9> <0 – 9>
  →<1 – 1> <0 – 1> <0 – 9>
  →<1 – 1> <2 – 2> <0 – 7>

In the foregoing example, the range defined for a signed integer decimal constant is from 1–127. Additional grammar rules would be defined by performing step 156. Performing step 158 using the above range of 1–127 would produce the four grammar rules shown above accurately representing the type <si-decimal-literal> (signed integer decimal literal).

Whether or not a literal associated with a different programming language can be accurately represented using the grammar rules in the foregoing technique depends upon whether the standard provides unique disjoint mapping for the various types of literals.

A programming language standard may also include other mechanisms by which a literal is converted or forced to a different data type. For example, the "C" programming language defines suffixes which data type literals, such as floating point literals, sometimes converting or changing the data type of a literal. According to steps 146, 148 and 150 additional rules must be added to include these suffixes in accordance with the language standard. For example, the ANSI "C" programming language defines suffixes for integer and floating point literals.

The foregoing example for typing literals using a suffix is particular to the "C" programming language. Generally, a different programming language requires additional grammar rules describing the types of literals of the programming language and particular mechanism included in the language for indicating types.

It should also be noted that the foregoing technique of generating grammar rules regarding integer literals, as in step 146, is not restricted to integer type literals. Rather, as previously described, the foregoing technique depends upon whether a literal value can be uniquely mapped to a literal type. In the foregoing description, this mapping is done by examining the literal value for a designated format, such as octal.

Generally, note that when performing step 108 for a different programming language and a different standard, the constraints of literals described by the grammar may vary. For example, the ANSI "C" programming language standard includes particular types of character literals, such as hexadecimal and octal escape sequences, which may not be included in other programming languages. Thus, when performing step 150 grammar rules are added which accurately describe these types of character literals for the "C" programming language. However, for a different programming language such as Pascal, such escape sequences may not be included as part of a corresponding programming language standard and thus are not represented within the grammar rules when performing step 150.

Referring back to FIG. 7, thus far steps have been described for building the initial or static grammar used in the test generator 33. For example, previously described is how literal constraints are described by grammar rules. Similarly, techniques have been described for adding other constraints such as base type constraints into the grammar. What will now be described are techniques used for dynamically augmenting the static grammar.

The technique of dynamically augmenting or expanding the grammar is used in conjunction with a derived type as defined in a programming language. Additionally, a programming language may be a "declare before use" language in which the programming language requires that a variable or identifier be declared prior to a use or appearance within a programming statement. For example, "C" is a declare before use language having declare before use constraints. Dynamic augmentation of the grammar is used to dynamically include "declare before use" constraints.

Referring back to FIG. 7, steps 110 and 112 are dynamic augmentation steps performed during the expansion of nonterminals. For example, the grammar used within the test generator 33 to generate "C" test programs would include the capabilities of performing steps 110 and 112.

Referring now to FIG. 11, an example embodiment of a method for including derived type constraints into the grammar using the technique of dynamically augmenting the grammar during expansion of nonterminals is shown.

Within the initial or static "C" grammar, grammar rules exist which contain nonterminal symbols for a derived type. A nonterminal symbol for a derived type is a potential nonterminal symbol. Generally potential nonterminal symbols are nonterminal symbols which, in the initial static grammar have no associated grammar rules. When a rule containing a potential nonterminal symbol in its right hand side, is selected at step 160 during the expansion process, grammar rules or productions defining the potential nonterminal symbol are added thereby making the potential nonterminal symbols technically a nonterminal within the grammar when the new production or rules are added.

Referring back to FIG. 6b in the expand logic of the expand nonterminal routine, at step 86 determination is made as to whether there is an existing rule in the grammar defining the nonterminal. It is at step 86 that a determination is made as to whether or not a nonterminal is a potential nonterminal representing a derived type. A determination of "no", that there are no existing rules in the grammar defining the nonterminal, implies that the nonterminal is a potential nonterminal symbol and subsequently results in execution of a meta-rule in step 88. It is in the execution of the meta-rule by which the grammar is augmented to include production or grammar rules defining the potential nonterminal.

Referring again to FIG. 11, in step 162 execution of the meta-rule for a potential nonterminal symbol adds a new parallel expression grammar as is added for each base type. In other words, a parallel expression grammar is added for each derived type as needed in accordance with the rules of the existing grammar chosen to expand based on the associated frequencies and probabilities. When a rule is selected which contains a derived type, need exists to expand the grammar to include rules defining this potential nonterminal associated with the derived type. At this time during test program generation, the existing grammar is dynamically augmented to include the needed production rules. The mechanism by which these new grammar rules or productions are added is by use of the meta-rule previously described in conjunction with FIG. 6b.

Generally, the meta-rule which can be implemented, for example, as a routine called from the expand routine, performs the steps 140, 142 and 144 thereby adding a parallel expression grammar, as was previously added for each base type.

An example illustrating the effect of a derived type and how the original grammar included in an embodiment of the test generator 33 is augmented will now be described.

```
1.  int x = 17;
    int *y = &x;
    :
    x = *y;

2.  int x;
    int *y;
    y = &x;

base grammar rule:
    <si-unary-exp> --> :
                       :
                     * <p2si-unary-exp> new rules generated:
    <p2si-assign-exp> -->   <p2si-lval-unary-exp> =
                            <p2si-assign-exp>
                      -->   <ps2si-cond-exp>
                            :
                     <more grammar rules generated in here>
                            :
    <p2si-cond-exp>         --> <p2si-unary-exp>
    %%% <p2si-unary-exp>    --> &<si-lval-unary-exp>
                            --> <p2si-primary-exp>
```

In the example above, two portions of code labeled 1 and 2 are shown. This sample "C" code is generated by the test generator 33 in a particular embodiment of the test generator for generating "C" programs. In the process of generating the last statement in the first code segment, x=*y, a derived type (*y) is encountered. This is known to those skilled in the art of "C" programming as a pointer to a signed integer expression. The base grammar rule selected which contains this derived type is also shown in the example above. Selection of this grammar rule within the base grammar or static grammar, as in step 160, causes execution of a meta-rule for the potential nonterminal for the derived type <p2si-unary-exp> corresponding to the type "pointer to signed integer" causing the generation of the code *y in code segment 1 last statement.

Selection of this potential nonterminal symbol in step 160 causes execution of a meta-rule for this potential nonterminal symbol as in step 162. The meta-rule causes the new rules to be generated as indicated above. These new rules are incorporated into the existing grammar, and can be selected for the generation of subsequent statements to be included in the generated test program. For example, code segment 2 is subsequently produced in the above example using the newly generated rules for the p2si subgrammar. Note that the rule marked with the percent (%%%) signs in the left hand margin is the rule selected from amongst the newly added grammar rules resulting in the production of the statement y=&x in code segment 2.

As previously discussed, a "declare before use" language, such as the "C" programming language, uses the technique of dynamically augmenting the grammar to include "declare before use" constraints.

Figure 12:
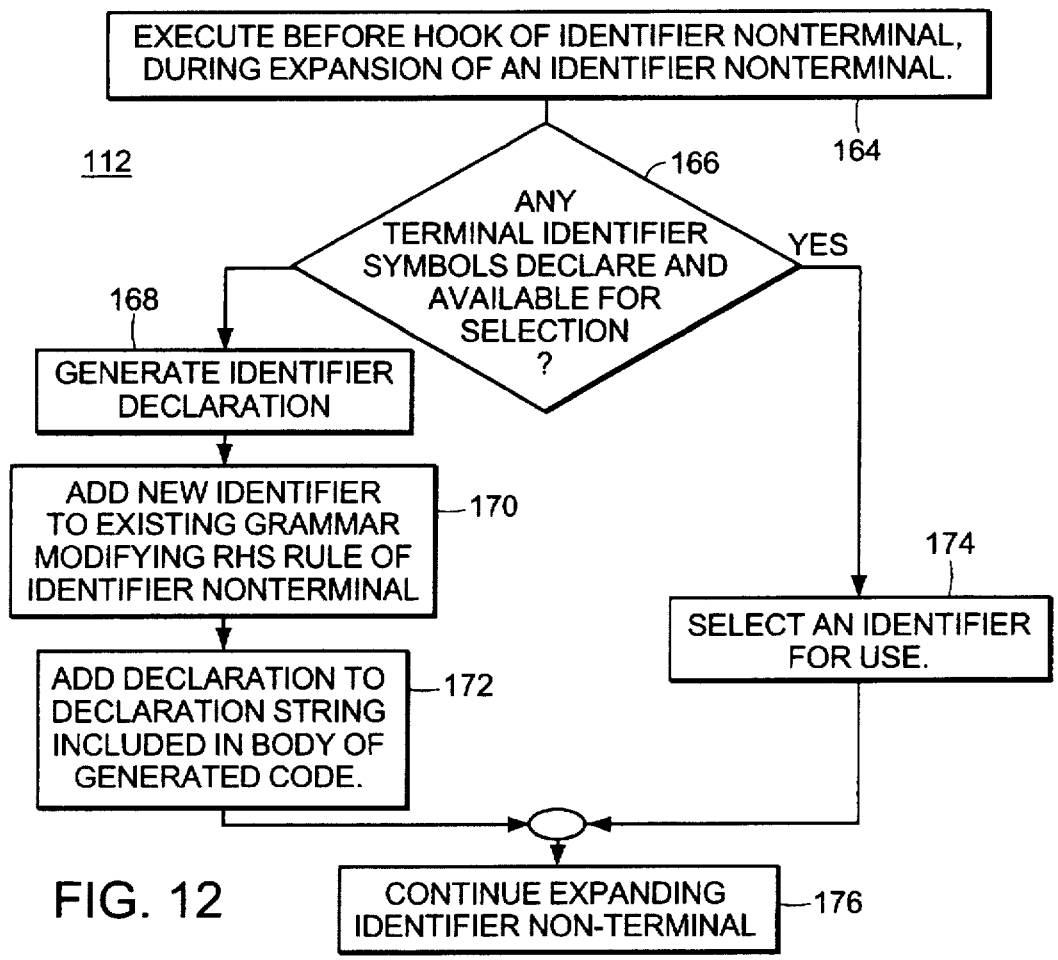
FIG. 12 is a flowchart showing an example embodiment of a method for dynamically modifying an initial grammar to include declare-before-use constraints.

Referring now to FIG. 12, an example embodiment of a method for dynamically modifying the initial grammar to include "declare before use" constraints is set forth. As previously discussed, "declare before use" constraints are associated with identifiers or variables which are used in statements. The "declare before use constraint" includes the requirement, for a particular programming language for which code is being generated, that the identifier be declared prior to its use within a statement of the generated body of code.

The overall technique is to generate a declaration for an identifier, if the declaration does not already exist when a statement or expression, for example, is generated which includes the identifier. Thus, it is the use of an identifier which generally triggers its declaration. Within the initial grammar, a nonterminal exists for each type of identifier. For example, for a signed integer identifier after incorporating LVAL and base type constraints into the grammar, a nonterminal symbol <si-lval-id> exists within an embodiment of the test generator for the "C" programming language. At some point during program generation, this nonterminal may be expanded.

As in step 164, a BEFORE hook corresponding to that identifier nonterminal exists and is executed. For example, during the expansion of a signed integer identifier nonterminal, a BEFORE hook corresponding to that identifier nonterminal is executed. Recall that a BEFORE hook is performed prior to selecting a right hand side rule for a nonterminal currently being expanded. The BEFORE hook, for example for the identifier nonterminal symbol, makes a determination as to whether any corresponding terminal identifier symbols are declared and available for selection. In other words, a determination is made as in step 166 as to whether there are any corresponding right hand side rule terminal symbols representing an identifier of a particular nonterminal type are currently declared and available for selection. Generally, the BEFORE hook checks to see whether there are any right hand side rules available corresponding to the nonterminal symbol currently being expanded. Note that this differs from a meta-rule in which the potential nonterminal symbol did not appear on the left hand side of a production rule prior to executing the meta-rule corresponding to the potential nonterminal.

Using a BEFORE hook in a "declare before use" context, the nonterminal symbol does exist already within the grammar as the left hand side of a production rule. However, the question being answered is whether there are any identifier symbols available for use in the right hand side of the production rule. In contrast with the meta-rule, the potential nonterminal symbol never appeared on the left hand side of a production rule until the meta-rule is executed adding such rules.

If a determination is made at step 166 that a terminal identifier symbol is available for use, one is selected in step 174. If a determination is made in step 166 that there are no terminal identifier symbols declared and available for selection, an identifier declaration is generated as in step 168. In step 168 generation of an identifier declaration typically requires obtaining a text name for an identifier of the particular type required in accordance with the nonterminal symbol currently being expanded. In one embodiment of the test generator, a routine is invoked which, for each routine call, generates and returns a unique text name for an identifier nonterminal symbol corresponding to a particular type.

Corresponding to the generated identifier declaration in step 168, a new identifier is added to the existing grammar in step 170 by modifying the right hand side rule of the identifier nonterminal.

In one embodiment of the test generator, a string of identifier declarations is maintained at step 172. Each time a new declaration is made, text corresponding to the declaration is appended or concatenated to this string of identifier declarations. At the end of test program generation, when it is time to output the actual text of the generated test program, the string of identifier declarations is output in the appropriate portion of the generated program.

Upon completion of either selecting an identifier for use at step 174 or generating the appropriate declaration augmenting the existing grammar rules at steps 168, 170 and 172, the identifier nonterminal is further expanded as in step 176.

Typically, a BEFORE hook routine performs steps 166, 168, 170 and 172. Thus, the BEFORE hook causes right hand side rules to exist prior to executing within the expand routine the step which selects an appropriate right hand side rule for the nonterminal being expanded. The BEFORE hook generally guarantees that an identifier is available for selection during the expansion of the nonterminal identifier.

Generally, the "declare before use" constraint is added or incorporated into the existing grammar by a BEFORE hook which modifies the grammar by adding additional right hand side rules corresponding to an identifier nonterminal currently being expanded. Typically, Hooks perform actions in response to certain events in the processing of the grammar.

Below is an example illustrating the use of a BEFORE hook implementing a "declare before use" constraint as well as additional semantics within the "C" language as defined in accordance with the ANSI "C" standard:

statements:
1. a=++b; allowed
2. b=++b; not allowed
grammar rule:
1. <si-lval-id>→b
2. <si-rval-id>→b Statement 1 in the above example , as recognized by one skilled in the art of "C" programming, represents a "C" programming language statement which assigns to a variable a the value of b+1. Additionally, the "++b" also affects the value of b by incrementing b prior to assigning its incremented value to the identifier or variable a. Statements such as 1 above are allowed in accordance with the ANSI "C" standard. However, statements such as 2 above are not allowed. Note that in statement 2 an attempt is being made to assign and increment b at the same time.

Hooks are the mechanism by which semantic constraints, such as the one illustrated in statements 1 and 2 above, in addition to the "declare before use" constraint can be implemented within a test generator. In a particular embodiment of the test generator, those nonterminals appearing on the right hand side of the equal sign in the above statements are expanded prior to expanding those nonterminals appearing on the left hand side of an equal sign. Expanding the nonterminals appearing on the right hand side of the equal sign, the nonterminal <si-rval-id> is expanded in accordance with grammar rule 2 above. The identifier "b" is selected to appear on the right hand side of the equal sign. Once "b" is selected as the identifier for use, a hook such as a DURING hook, sets the associated frequency or probability of a grammar rule for "b" as the LVAL identifier, for example rule 1, to zero. In other words, the probability associated with grammar rule 1 above, having a LHS of <si-lval-id> and a RHS of "b", is set to a frequency or probability of zero upon expanding the nonterminal <si-rval-id>. The effect of this modification is equivalent to marking the identifier "b" as "unavailable for use" as an LVAL identifier. Subsequently, nonterminals on the LHS of the assignment, such as when expanding the nonterminal <si-lval-id>, are not expanded in accordance with grammar rule 1 above. Rather, in accordance with the steps of FIG. 12 for "declare before use" constraints, prior to expanding the nonterminal <si-lval-id>, a corresponding BEFORE hook is executed which determines as in step 166 whether any terminal identifier symbol is declared for use and available for selection for that corresponding nonterminal. The BEFORE hook routine determines that no such identifier terminal symbol is declared and available for use. Even though within the grammar a terminal symbol exists on the right hand side of a grammar rule, that identifier has a frequency of zero and is not available for selection. Thus, the BEFORE hook determines that there are no terminal identifiers available for the corresponding nonterminal <si-lval-id> and control proceeds to step 168, 170 and 172 which, respectively, generate a new identifier declaration, modify the existing grammar to add this new identifier to the right hand side rule and adds this declaration to the declaration string included in the body of generated code.

The foregoing example illustrates one particular "declare before use" constraint embodiment and additionally how an embodiment uses the concepts of hooks, particularly BEFORE hooks, to implement a semantic constraint within the language for which code is being generated. Note also that in the foregoing example upon expansion of all nonterminals within a statement such as 1, an AFTER hook associated with a corresponding grammar production rule can be used to reset the frequencies of the identifiers indicating that they are available for use once again. Since the semantic constraint of not allowing the identifier b to be used is only restricted to that particular statement, as defined in the ANSI "C" standard, b is free to be used again as an identifier in generation of a subsequent statement.

Thus far, a description is given for producing statements included in the generated test program 50. A more detailed description is given in following text for reducing a test program once a problem has been detected.

Referring back to FIG. 4, once a test failure has been determined as in step 66, the test failure is reduced as in step 68 to aid a developer in problem analysis. Generally, the purpose of the test reduction step 68 is to simplify a program generated to the smallest version and simplest version of the program which also reveals the problem.

Figure 13:
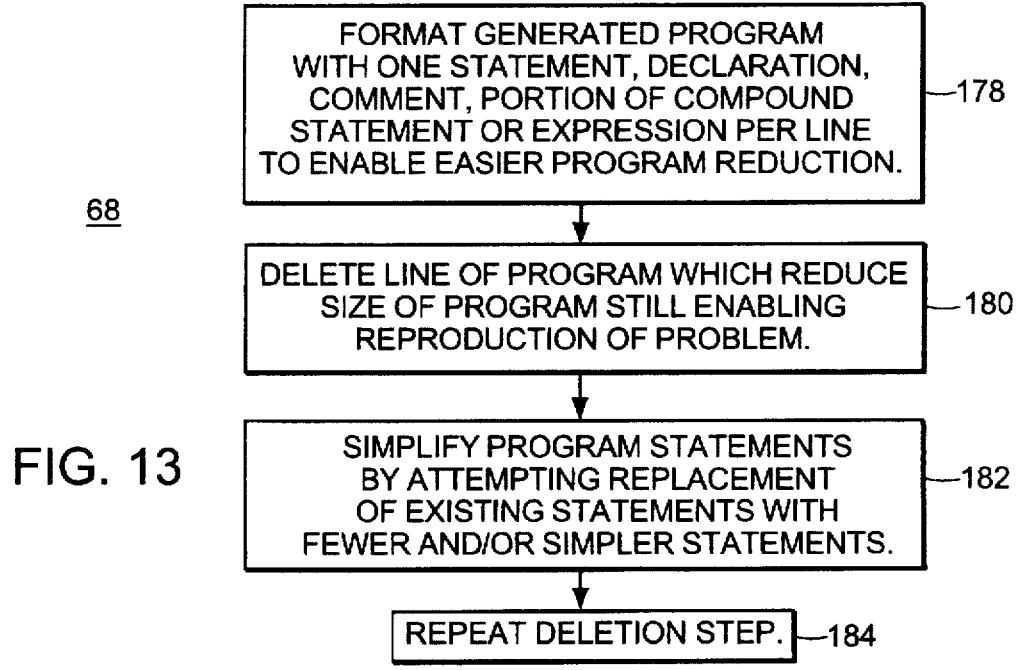
FIG. 13 is a flowchart showing an example embodiment of a method of reducing a test program.

Referring now to FIG. 13, an example embodiment of a method of simplifying a generated test program which fails is set forth. In step 178 the generated program is formatted with one statement, declaration, comment or a portion of a compound statement or expression per line. Typically, this enables easier program reduction in subsequent steps as will be discussed in following text. The program may be formatted as in step 178 using an automated method such as a program formatter rather than performing this via manual editing. In step 180 lines of the program are deleted in an attempt to reduce the size of the program but still enable reproduction of the problem. In step 182 program statements which exist are simplified by attempting to replace the existing statements with fewer and/or simpler statements. Finally, in step 184, the deletion step 180 is repeated to see if any further lines may be removed from the program and still enable reproduction of a test failure.

Figure 14:
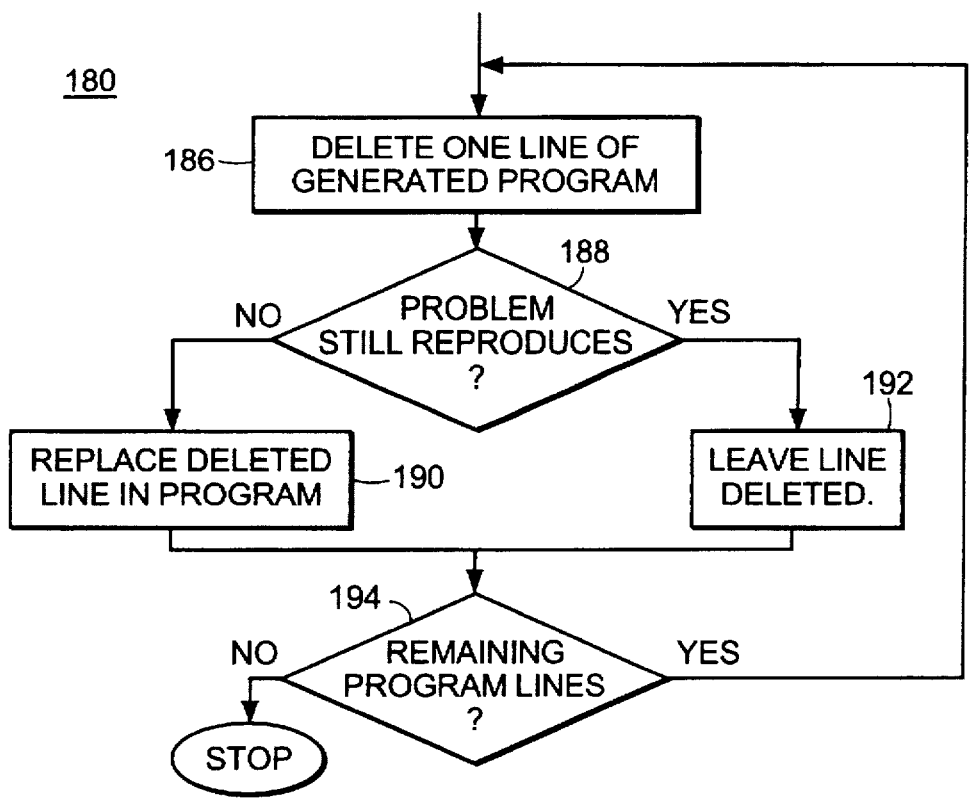
FIG. 14 is a flowchart showing an example embodiment of a method for deleting lines of a program reducing its size and still enabling reproduction of a test failure.

Referring now to FIG. 14, an example embodiment of a method for deleting a line of the generated program but still reveal the problem is set forth. In step 186 one line of the generated program is deleted. Note that in this particular embodiment, one line of the generated program typically corresponds to one complete program statement which may span multiple physical lines at this point in processing due to the reformatting previously done. For example, the program formatting as performed in step 178 may result in a statement of the following format below:

1. a=b
2. *c
3. +d;

In "C", a complete statement, as can be seen from the example above, includes all of the text to the semi-colon. The single program statement occupies three physical lines after being formatted in step 178. The deletion of one line of the generated program in step 186 results in the deletion of the three physical lines in the above example.

In step 188 a determination is made as to whether the problem or test failure is still reproducible. To determine if this problem is still reproducible and still revealed using the modified test program, all compilers used in step 62 of FIG. 4, for example, are used to recompile the source program. Machine executables corresponding to the compiler source program are produced and executed producing new results which are compared in order to determine if there has been a difference in test failure. Generally, determination of whether the problem is still reproducible in step 188 includes performing steps 62, 64 and 66 of FIG. 4.

If a determination is made at step 188 that the problem is not reproducible and the test no longer fails as before, the line deleted in step 186 is put back into the program in step 190. If at step 188 determination is made that the problem still reproduces and the test still fails with the same behavior prior to the deletion, the line is left out as in step 192. Control proceeds to step 194 where a determination is made as to whether there are additional program lines within the generated program that we can attempt to delete. If there are remaining program lines, control proceeds back to the top of the loop at step 186. If there are no more program lines to attempt to delete, in other words we have attempted to delete every line of the program, control proceeds to subsequent processing in step 182 of FIG. 13.

Note that when attempting to delete a line from the generated program the process described in conjunction with FIG. 14, step 180, can be performed in a bottom to top fashion or a top to bottom fashion with regard to the generated program. The choice as to whether deletion begins at the top of a program is language dependent. For example, "C" is a declare before use language and, therefore, program line deletion typically begins with the bottom of the program or end of the program and proceeds to the top of the program or the first statement of the program. Attempting to delete lines in this fashion minimizes the number of deletion failures, e.g., deletions determined at step 188 which do not reproduce test failures. In other words, if reduction of a "C" program begins at the top of the program, it is more likely to produce a behavioral change that does not enable reproduction of a test failure. Thus, the efforts to reduce the program are moot. Since step 180 is a time consuming step, in particular at step 188 where a determination again must be made as to whether the problem is still reproducible as previously observed, a preferred embodiment of the test generator considers this language dependent issue, e.g. as to whether deletion begins with the top or bottom of a program, to minimize the amount of unsuccessful deletions.

In step 182 of FIG. 13, an attempt is made to simplify the existing program statements by attempting to replace an existing program statement with a simpler program statement or removing the statement altogether.

Figure 15:
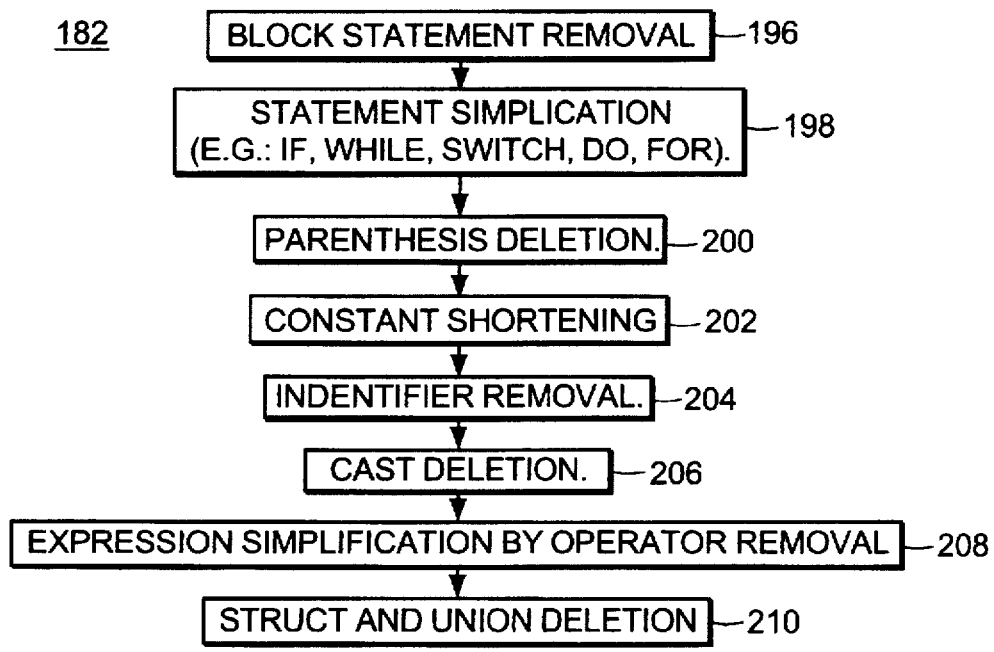
FIG. 15 is a flowchart showing an example embodiment of a method for simplifying program statements included in a test program.

Referring now to FIG. 15, an example embodiment of a method of simplifying a program statement is set forth. Note that many of the simplifications which will be described in following text have been determined using the "C" programming language but also generally apply to other programming languages.

The table below summarizes simplifications and removals which will be described in conjunction with steps of FIG. 15.

TABLE 2

| Step | Reduction | Replace | With |
|---|---|---|---|
| 196 | Block statement removal | {statements} {statements} | ";" statements |
| 198 | Statement simplification | if (e)s1 while (e)s1 for (e1;e2;e3)s1 do s1 while (e) | s1 s1 s1 s1 |
| 200 | Parenthesis deletion | (e) (e) | "1" e |
| 202 | Constant/literal shortening | 359876 | 1 |
| 204 | Identifier removal | x=y | x=1 |
| 206 | Cast deletion | (char) e | e |
| 208 | Expression simplification | x=y+z+p | x=y+z or x=y |
| 210 | Struct and union deletion | struct id{ ... } union id { ... } | |

Note that following each of the steps which will be described in conjunction with FIG. 15, after performing one of the steps 196–210, a determination is again made to insure that the problem is still reproducible. If not, an alternative replacement or simplification is tried or the original statement is completely replaced. Note that all language elements described with particular reference to the "C" programming language are known to those skilled in the art of "C" programming.

In step 196 an attempt is made to remove block statements. For example, in "C", block statements are indicated by curly braces { }. An attempt is made to remove the block statement completely and replace it with a semicolon. An alternative, if this attempt fails, is to remove only the curly braces leaving the statements within the block intact.

In step 178 an attempt is made to simplify various statements within the programming language. For example, in the "C" programming language there are various compound statements or complex statements such as the if, while, for and do statements. Note that in the above table, statements listed as corresponding to step 198 are not inclusive or indicative of all of the statements which can be simplified.

In step 200 an attempt is made to delete or remove parentheses surrounding an expression. As a first alternative, the constant literal 1 is used to replace the parenthesized expression. If that fails to reproduce the problem and cause the same test failure, the parentheses surrounding the expression are removed and the expression itself remains.

In step 202, an attempt is made to shorten constants. In other words, a constant or literal is replaced with a simpler or smaller constant or literal. In the above table, complex literals such as 359,876 are replaced with a simple constant or literal 1.

In step 204 identifiers are removed and replaced with a constant such as the constant 1. In step 206 typecasting is deleted. For example, in the above table the expression E is being typecast as a character data type. Within the program generated, this would be replaced with the expression "e".

In step 208 an attempt is made to simplify an expression such as an arithmetic expression by removing various combinations of operators and operands. In the above table, for example, an attempt is made to simplify the expression y+z+p which is being assigned to an identifier X. As a first alternative, the operator and operand combination +p is removed. If this still enables reproduction of the test failure, subsequent combinations of operator and operands are removed. For example, +z would be removed from the expression.

In step 210 an attempt is made to delete structure and union declarations. A multi-line structure or union declaration is more likely to be deleted successfully when performing step 184 of FIG. 13 because prior statements dependent upon this declaration may have already been deleted. Thus, the structure or union declaration becomes unnecessary and is subsequently deleted at step 184.

It should be noted that a structure or union declaration may have a parallel language element within a different programming language. For example, the structure within the "C" programming language is equivalent or comparable to a record declaration in a language such as COBOL. Similarly, other reductions and simplifications previously described may be implemented in conjunction with a test generator 33 generating programs for another programming language in which that other programming language has a language element which parallels or is equivalent to previously described "C" language constraints. Thus, the foregoing replacements and simplifications should not be construed as being limited to only the "C" programming language.

Referring back to FIG. 5b at step 81 a determination is made as to whether a corresponding program which is generated is in compliance with various run time constraints. Recall that part of being a conforming program includes conforming to syntax, semantic and run time constraints.

Figure 16A:
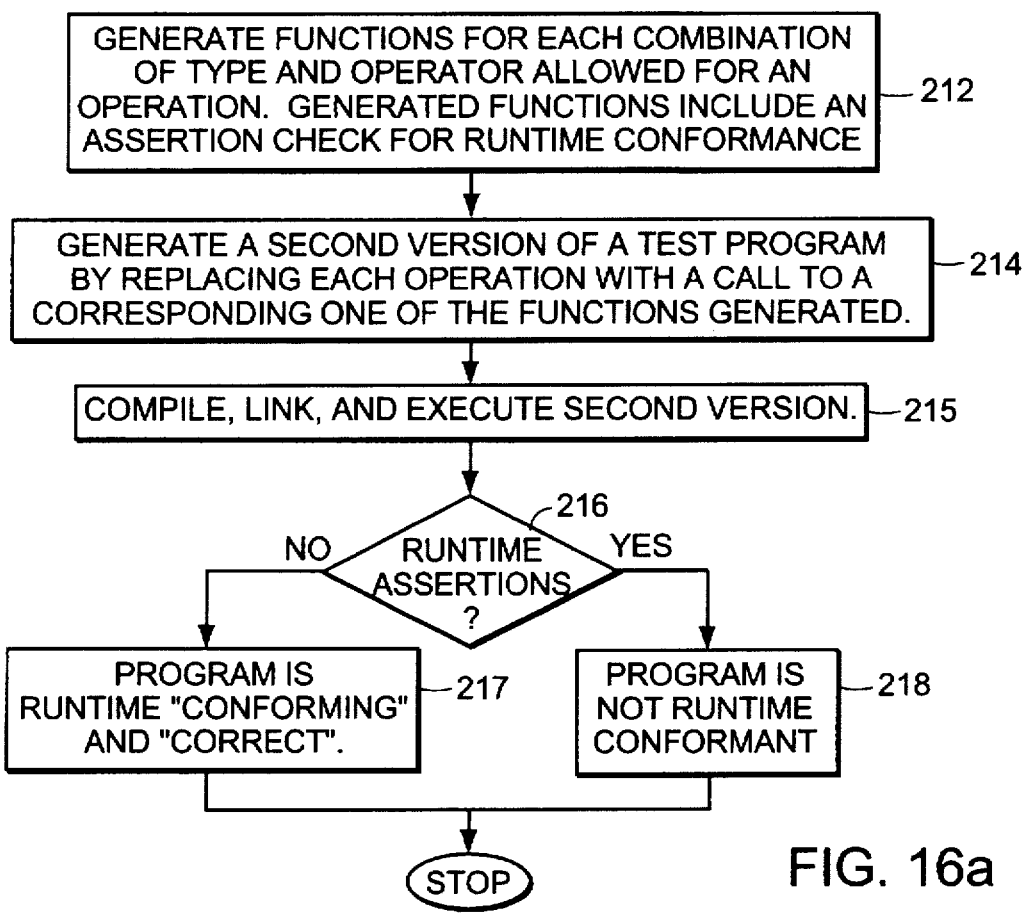
FIG. 16a is a flowchart showing an example embodiment of a method for performing runtime conformance checking of a test program.

Referring now to FIG. 16a, an example embodiment of a method of performing a run time conformance check of a generated test program is set forth. Note that the run time conformance check in a preferred embodiment is performed prior to performing the test reduction but after a difference is detected. If either the run time conformance fails or there is no difference there is generally no reason to reduce the test source program since both conditions are required in order for the execution of a machine executable produced using a test program to be deemed a failure.

The general technique described in FIG. 16a uses a mechanism which performs run time checks and validations upon the values requiring a run time conformance check. One embodiment for performing a run time conformance check involves generating a function for each combination of type and operator allowed for an operation as in step 212. The generated functions include an assertion check for a run time conformance in accordance with the programming language standard.

In step 214, a second version of the failing test program is generated. In the second version of the test program each operation is replaced with a call to a corresponding one of the functions generated in step 212.

In step 215 the second version of the test program is compiled, linked and executed. Note that step 215 in accordance with the differential testing technique is performed with each compiler currently being tested. In step 216 during the execution of the test program, a determination is made as to whether there are any "run time assertions" (or "assertions") made by the generated function called. A runtime assertion is an indication that a runtime check performed is unsuccessful. For example, a runtime assertion check is performed to check a value for underflow or overflow range. If the assertion check is unsuccessful, for example a value is out of the underflow/overflow range, a runtime assertion, such as a print statement, occurs indicating the failed assertion.

If there are no such program assertions, the generated test program from which the executable test program is produced is deemed to be run time conforming and, generally, a conforming program. If there are run time assertions, the test program is not run time compliant as in step 218.

If a determination is made that the test program is not run time compliant, referring back to FIG. 4 at step 66, control may proceed to step 74 to examine additional test results. An embodiment may change the order of particular steps 80 and 81 without affecting the overall testing process. However, a preferred embodiment determines differences in output at step 80 prior to determining if a corresponding test program is run time compliant in step 81. This is because step 80 generally requires less work and time than step 81 to complete. If at step 80 it is determined that there are no differences in output, then step 81 need not be performed. Generally, a determination at step 80 that there are no differences in output elimintates the need to perform step 81 to determine if the test program is run time compliant due to the compound condition that must be met to deem a program a test failure, i.e., the compound condition being that there must be a difference in output and that the corresponding test program must be run time conformance.

Below is an example of two versions of a statement generated by a particular embodiment of a test generator 33:

version 1: si37+si46;

version 2: si_add(si37, si46);

In the above example, version 1 contains an expression which may be included as part of a statement generated in a programming language such as C. Using the notation where si represents signed integer, si37 and si46 are being added together in version 1 as indicated above. Version 2 contains the name of a function si_add which corresponds to the combination of adding two signed integer operands. Version 1 indicated above appears within the original failing test program. Version 2 appears within the second version of the test program as generated in step 215. Included below is the pseudocode representation for the logic of the routine si_add as generated in step 212 representing one of the valid combinations of operand type to be used with the add operation.

```
int   si_add  (int i, int j)
}
      assert  (i + j< = INT_MAX) and
              (i + j> = INT_MIN)
      return  (i + j)
}
```

Included within the body of the routine si-add is an assertion check in which the values for range of i and j added together are checked to make sure that no overflow or underflow are caused. The assert statement in the function definition si-add represents the logical function or test to be accomplished. Note that in a preferred embodiment, "i" and "j" are not typically added to perform the assertion check because by performing that actual addition an overflow may be caused and the program being executed fails rather then proceeding to further assertion checks also implemented via function calls.

Therefore, in a preferred embodiment of performing runtime conformance checks, mathematical equivalents are determined to perform the actual assertion without performing the actual addition of i and j causing the overflow. For example, the above assert statement is implemented in a "C-style" statement such as:

assert (i>0  ?  j< = INT_MAX - i

: j> = INT_MIN - i)

Mathematical equivalent:

i>0 AND j<=INT_MAX-i i<=0 AND j>=INT_MIN-i

In the above example, the mathematical equivalent previously expressed in the assert statement is actually implemented in the run time conformance check.

As will be known to those skilled in the art of compilers, an optimizing compiler which performs the constant folding optimization may perform such assertion checks using mathematical equivalents prior to performing a constant folding optimization. Generally, the constant folding optimization involves a compiler detecting a constant expression and evaluating that expression at compile time rather than generating code for the evaluation of the constant expression at run time. Prior to the compiler performing the actual evaluation of the constant expression to be constant-folded, the compiler typically verifies using a technique, for example, employing mathematical equivalents, that the values of the constants will not cause an overflow or underflow when performing arithmetic operations. If the compiler blindly attempts to perform an arithmetic operation in a constant fold without checking the range, the compiler itself may fail with an overflow or underflow failure. Thus, the compiler uses mathematical equivalent checks such as the above example to check the range of values.

Figure 16B:
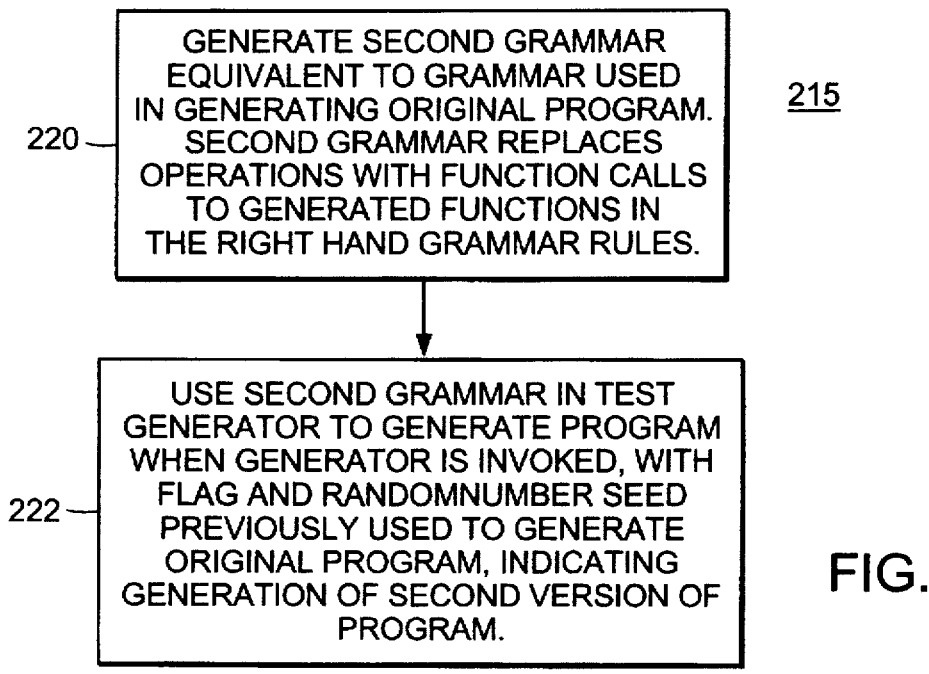
FIG. 16b is a flowchart showing an example embodiment of a method for generating a second version of a test program.

Referring now to FIG. 16b, an example embodiment of a method of generating a second version of the failing test program is set forth. In step 220 a second grammar is generated which is equivalent to the initial grammar used in generating the first program. The second grammar is equivalent to the initial grammar with the exception that various combinations of type and operator terminals are replaced with the generated function calls in the right hand side of the grammar rules. For example:

version 1 rule: <si-add-exp>→<si-add-exp>+<si-mult-exp> version 2 rule: <si-add-exp> - si_add ( si-add-exp, si-mult-exp);

The version 1 rule exists in the initial grammar used to generate the first failing program. In performing step 220 an equivalent rule would exist in the generated second grammar replacing the arithmetic operand operator combination on the right hand side of the rule as shown with the version 2 rule above. In step 222 the second grammar described above is used within the test generator 33 to generate version 2 of the program. In one example embodiment of test generator 33, the second grammar is produced in a manner similar to the initial grammar previously described. When the generator is invoked with a particular flag, for example on a command line, the flag indicates that the second grammar rather than the initial grammar is to be used in program generation, consequently, produce a version 2 of the program.

One mechanism used in grammar rule selection within the test generator includes using a random number generator. In one embodiment of rule selection within the test generator, a random number generator generates a random number which is mapped to the frequencies or probabilities associated with multiple grammar rules for a given nonterminal symbol. As it is known to those skilled in the art, a random number seed is an initial number input to the random number generator to produce a series of pseudo random numbers. In the test generator 33, these pseudo random numbers are used to select a production rule. By using the same random number seed on a subsequent run or execution of the test generator, given that the frequencies or associated probabilities are constant, the same grammar rules are selected. Thus, in one embodiment a random number generator is used. In performing step 215, the same grammar rules selected in producing the original failing program will be selected during generation of version 2 of the failing program, if the same random number seed is used when producing version 2 of the program. In implementing the test generator which can generate either a version 1 or version 2 of a program, the same random number seed is used in the random number generator. The random number seed is an input, for example, that may be included as user input 84.

It should be noted that the functions generated within step 212 of FIG. 16a are typically only generated once. The correct combinations of operand type and operator can be found within the text of a standard for the programming language being generated. Only functions for valid combinations of operands and operators are generated because, using the grammar describing type constraints, the generator will only generate such valid combinations.

The generation of the functions within step 212 can be automated. For example, a program is written which outputs the generic portions of each routine such as a function header and the return statement in the previous example. Other statements such as the assert statement within the body of each function is determined for each class of operators by reading the text of the standard associated with the particular programming language.

Generally, generation of the many of items described in the foregoing techniques can be done in an automated fashion. For example, routines may be written in a programming language to produce the various subgrammars. Similarly, as previously described, routines can be used to generate the various combinations of functions used in the run time conformance check.

One technique used to generate a base type grammar in an automated fashion includes writing a routine in a programming language which generates the base type grammar. For example, in the process of building the initial grammar, a current grammar includes the RVAL, LVAL and constant subgrammars. The base type grammar restrictions need to be included into the current grammar to produce the initial grammar. Recall that base type restrictions are added by generating other subgrammars, as previously described. The pseudo code below represents the logic of a routine which can be written to generate grammar rules including the base type restrictions.

```
PROC_nonterminal_gen_mult_exp()
{
for each X in {"RVAL", "LVAL", "CONSTANT"}
    for each TYPE in {"float", ... "double", ... }
        print $TYPE-$X-mult-exp /** LHS
        /** now print out RHS of rule ***/
        print "  $TYPE-$X-mult-exp * $TYPE-X$-cast-exp";
            :
        /** conditional rule
        if ($TYPE ! = "float") and ($TYPE ! = "double")
```

```
            print (" $TYPE-$X-MULT-EXP % $TYPE-$X-cast-exp");
        end for
    end for
}
```

In the above example, the routine generates the grammar rules associated with the nonterminal mult-exp. The logic of the routine comprises 2–4 loops, nested, for the given nonterminal mult-exp. The right hand side rule or rules are output for each combination of type and parallel grammar RVAL, LVAL and constant denoted "X" in the example above. The logic which conditionally outputs certain rules under certain conditions can be embedded within a routine generating grammar rules. In the above example, a conditional rule is output dependent upon the base type. As previously discussed, the percent operator in the C programming standard is a remainder operator which does not allow floating point operands if statement in the above example does not output the percent or remainder operator if the operand types are float and double. One skilled in the art realizes the modifications necessary to the above code example which are required for a particular programming language for which code is being generated. For example, the types vary with programming language. Similarly, the logic for outputting a conditional rule varies with programming language and standard.

One embodiment of the test generator is written in a programming language called TCL. Additionally, routines are written to automate the foregoing technique, for example, to produce the parallel expression grammars previously described. TCL is a language available in the public domain. The TCL programming language is described in "TCL and the TK Toolkit", by John K. Ousterhout, published by Addison-Wesley, 1994 (ISBN 0-201-63337-X).

Generally, the language chosen to implement the test generator and automate the production of various items used in the foregoing technique vary with embodiment. Typically, the language chosen to implement the test generator, if using methods and techniques describes herein, preferably includes string handling capabilities and allows recursion.

A generated program 50 of FIG. 2 produced by the test generator 33 includes portions of code which are language dependent and implementation dependent. For example, in the foregoing description the test generator 33 was described as generating "C" source code compliant with the ANSI "C" standard. Since "C" is a "declare before use language", the generated program 33 includes a declaration section prior to the actual statements generated by the grammar rules. The following generally describes the different portions of a generated program in one embodiment of the test generator 33 for generating "C" programs.

1. comments
2. include files
3. declarations
4. generated program statements
5. print statements In the above example, there are 5 portions to a generated program. The first portion includes comments which may describe certain properties about the generator, the programming language being generated as such for developer reference. The second portion of the program are include files which are particular to the "C" programming language, for example, including common or library supplied definitions. The third portion of the program are the declarations as generated by the test generator 33. The fourth portion includes generated program statements produced from a terminal string derived using grammar rules and the nonterminal expansion technique of test generator 33 previously described. The fifth portion includes print statements, for example, such as those printing values used within the generated program or other informational statements as needed. Additionally, the generated program will include language specific features acquired for a valid program. For example, in "C" every program must have a main routine with the parameters "argc" and "argv".

Using the foregoing technique for program generation, correct or conforming programs are produced by incorporating semantic constraints into the grammar used to generate a program causing fewer nonconforming or incorrect programs are generated. In other words, the grammar rules are enhanced to minimize the possibility of producing incorrect or nonconforming programs.

Using the foregoing technique in program generation, a balance between storage and generation time required to generate a program is achieved by having a dynamically modified grammar. That is, for particular types, the grammar is only made larger as needed depending upon the selected grammar rules rather than including more rules in the initial static grammar. The grammar is dynamically modified using various mechanisms such as hooks and meta-rules.

An embodiment allowing a user to influence or select frequencies or probabilities associated with grammar rules should take steps to insure that the frequencies or probabilities do not cause infinite program generation by having an infinite loop in the rule selection for program generation. Grammar rules, as previously described, recurse. Those rules which recurse include many nonterminals which in turn produce other nonterminals, for example, and should have a low probability associated with their selection. A preferred embodiment of the test generator includes a mechanism to minimize the possibility of an infinite loop in this rule selection.

One technique includes placing limits or bounds on the probabilities associated with each rule. For example, by using a predetermined range of probabilities to be associated with a particular grammar rule where those probabilities have been determined through testing to terminate program generation within a reasonable time. This technique assigns high probabilities to those rules, for example, containing all terminal symbols.

In implementing a test generator for a particular language, those skilled in the art will recognize the need to modify particular portions described previously in accordance with that particular programming language. However, the general techniques and mechanisms described previously can be employed in implementing a test generator and a differential testing technique for many different programming languages. Additionally, the differential testing technique previously described can be used in testing software other than compilers and should therefore not be construed as being limited to language processors or compilers.

Figure 17:
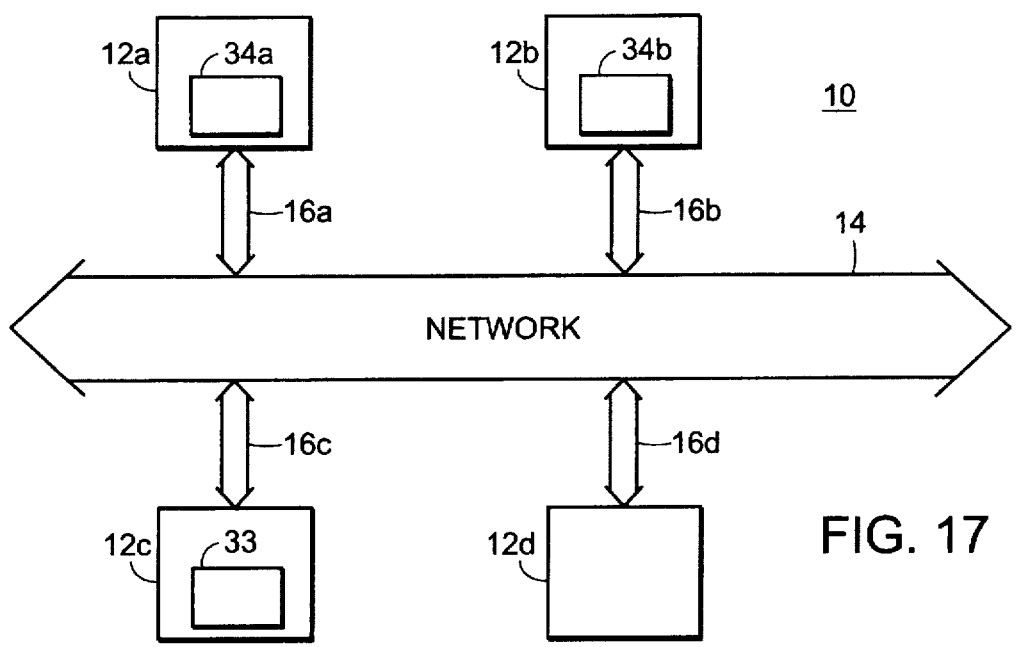
FIG. 17 shows an alternate embodiment of the computer system of FIG. 1 in a computer network.

Referring now to FIG. 17, an alternate embodiment of a system including the test generator 33 of FIG. 1 is shown. Computer systems 12a–12d are connected over a network 14 and communicate via network interfaces 16a–16d respectively. Language processors 34a, 34b previously discussed in conjunction with FIG. 1 reside in different computer systems in the embodiment in FIG. 17. Similarly, the test generator 33 previously discussed in conjunction with FIG. 1 resides in computer system 12c. The test generator 33 remotely runs language processors 34a and 34b on their respective computer systems. In a preferred embodiment of test generator 33, the ability to remotely execute and compare the results of different compilers each residing in a different computer system is desirable. Such capability provides great flexibility in that the test generator and compilers do not have to physically reside within any particular location.

As previously seen, hooks are used to dynamically adjust probabilities associated with grammar production rules during program generation within the test generator. Dynamically adjusting probabilities can be used as a technique to limit the nesting level of certain language elements in a particular programming language. For example, probabilities can be decreased to limit the selection of rules generating nested parentheses, nested compound statements, such as while, if and for statements in the C programming language. The technique of dynamically adjusting probabilities involves subsequently decreasing the probability of a statement producing, for example, a new nesting level of a parenthesis each time a statement is selected. Hooks can be used to adjust these probabilities. For example, a BEFORE hook can be used to decrease the probability when expanding a nonterminal resulting in a statement which is nested. Thus, each time such a statement is selected the probability is further decreased. Generally, such a mechanism is desirable when generating programs in a particular programming language. Typically a programming language has a limit to the level of nested parentheses and statements for example which a standard conforming compiler is required to process. Therefore, if control is not placed within the test generator upon limiting these types of nested statements, the chances of generating a program which is nonconforming may increase.

Hooks are also used as the mechanism to implement dependent semantics. An example of dependent semantics was previously described in conjunction with an example of an increment operator in the C programming language. The restriction in the C programming language standard is that the same identifier cannot appear on both sides of the equal sign, e.g. a=++a is invalid. To implement such semantic constraints, hooks are used.

Hooks can also be used to minimize the chance of producing a program which is not run time conformant, e.g., minimize chance of producing a source program which does not conform to runtime constraints. For example, in the "C" standard the shift operator, e.g., a>>b or a<<b, provides for a right or left shift. In the example a>>b a is shifted to the right b number of bit locations. The C standard may state, for example, that b must be a signed integer between 1 and 64. However, b is evaluated at run time. Thus, we cannot build into the grammar all the constraints as with type constraints necessary to insure that b will be run time conferment as its value is determined at run time. To increase the probability that b will be evaluated and be run time conformant in accordance with the standard, probability associated with grammar rules which would assign large values to be are decreased or eliminated. For example, operations like bit complement as defined within the C standard typically produce large numbers. Therefore, test generator 33 can use hooks to decrease or eliminate the probability of generating code which includes bit complement assignments once the grammar rules associated with generating the shift operator have been selected.

As part of reducing a failing test in step 68, after the test is reduced to its smallest size and simplest form, the reduced program can be reformatted to make it more user readable for examination by a developer. For example, a program reformatter such as "cb" or "indent" both included in the Unix® operating system perform such operations.

The technique of generating a second version of a test program as described in conjunction with FIG. 16a can also be used to test software against itself.

Figure 18A:
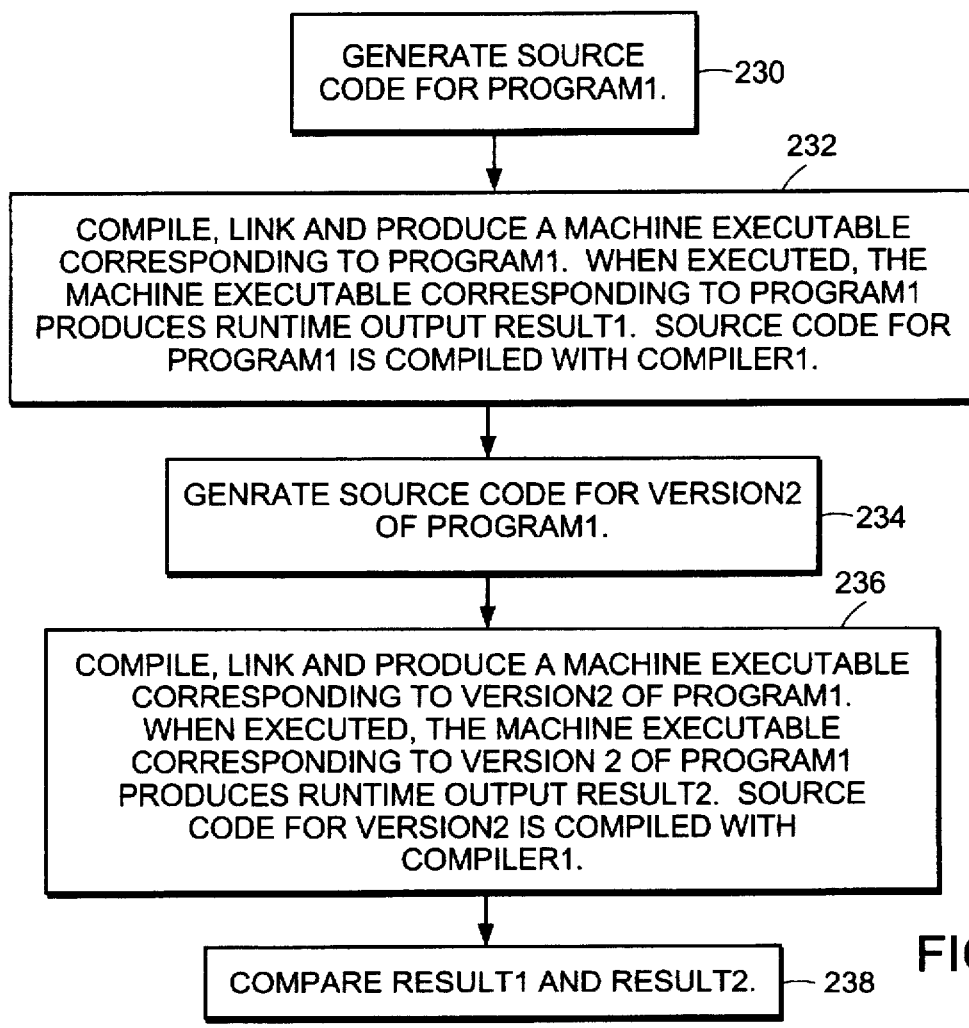
FIG. 18a and FIG. 18b are flowcharts depicting additional methods for testing software.

Referring now to FIG. 18a, an example embodiment of a method of testing software against itself is set forth. The overall technique depicted in FIG. 18a executes two versions of a program whose machine executables are produced using the same compiler. The two programs should produce the same result. If they do not, an error is detected within the compiler. In step 230 conforming source code for program 1 is generated. One technique used to generate source code for example is by using the test generator 33 previously described. In step 232 program 1 is compiled with compiler 1. Subsequently, the resulting object file is linked to produce a machine executable corresponding to program 1. When executed, the machine executable corresponding to program 1 produces run time output result 1. In step 234, source code for version 2 of program 1 is generated. The version 2 of program 1 occurring in step 234 is the second version of a test program generated, as in step 215, in which operations and operands are replaced with function calls as previously described. In step 236 version 2 of program 1 is compiled with compiler 1. The resulting object file is subsequently linked to produce a machine executable corresponding to version 2 of program 1. When executed, the machine executable corresponding to version 2 of program 1 produces run time output result 2. Result 1 and result 2 are compared as in step 238. Generally a difference in result 1 and result 2 for which there is no run time assertion indicates a different type of error within the compiler 1. Typically result 1 and result 2 should be equivalent.

The testing technique described in FIG. 18a set forth a different way to test a compiler or other piece of software against itself detecting errors within various portions of the code included in the compiler or other software.

Figure 18B:
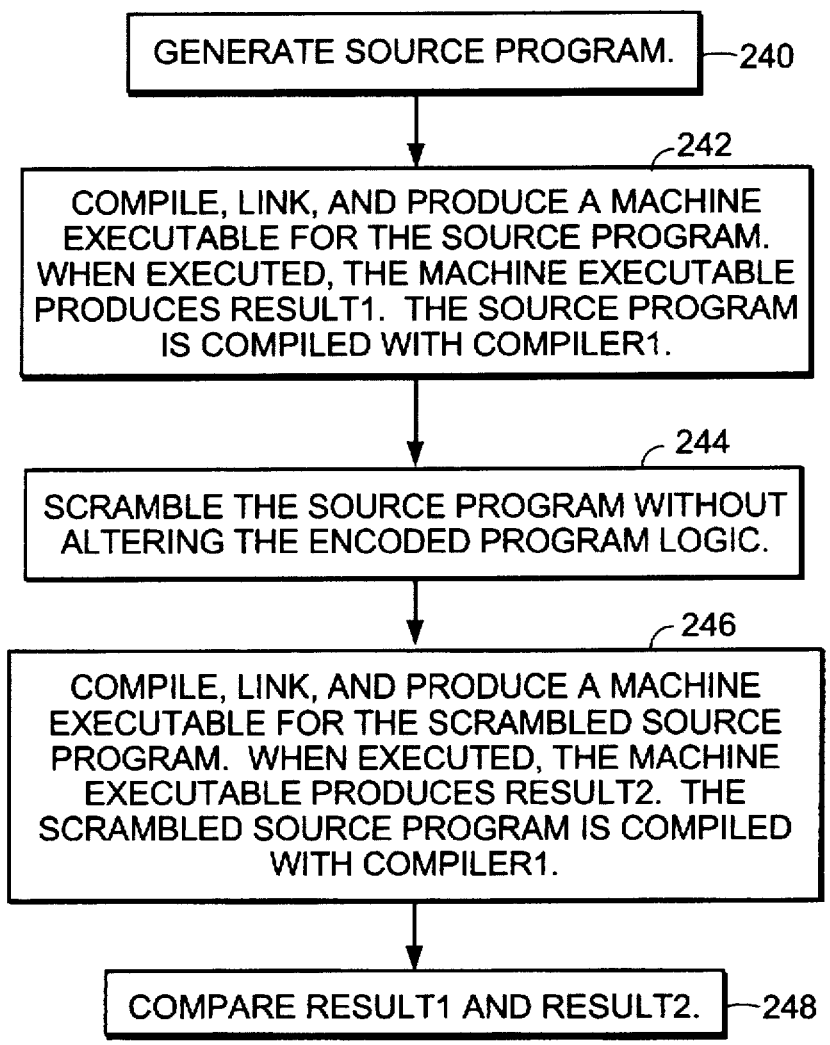

Referring now to FIG. 18b, another example embodiment of another technique for testing a compiler or other piece of software against itself is set forth. A source program is generated in step 240. One technique used to generate the source program, for example, includes using the test generator 33 as previously described. At step 242 the source program is compiled with compiler 1 producing an object file which is subsequently linked to produce a machine executable. When executed, a machine executable produces result 1. In step 244 the original source program produced in step 240 is scrambled without altering the encoded program logic within the source program. For example, statement order is altered where various statements are removed as with the previous deletion technique described in conjunction with the test reducer. In step 246 the scrambled source program is compiled with compiler 1 producing a corresponding object file which is subsequently linked to produce a machine executable. When executed, the machine executable produces result 2. In step 248 result 1 and result 2 are compared. Generally, as with the previous technique described in conjunction with FIG. 18a, result 1 and result 2 should be equivalent. If not, there is typically an error or a problem with encode associated with the compiler which compiled the source program and the scrambled version of the source program.

It will be recognized by those skilled in the art that the foregoing techniques described in FIGS. 18a and 18b can be adapted for use with other pieces of software besides compilers when using the same underlying testing technique. This program which is scrambled as in step 244 can be scrambled with a software tool typically known as a shrouder. Generally, as it is known to those skilled in the art, a shrouder is a software tool which scrambles a source program statement without affecting the logical result of the program. Typically, shrouders are used to scramble source code whose objects are made publicly available such as those shipped with a software product. This scrambling is done to prevent disassembling or other forms of reverse engineering of product. Software tools such as shrouders can be used in scrambling source programs, as in step 244.

The foregoing preferred embodiment describes a particular embodiment of the test generator for generating a particular programming language, e.g., the "C" programming language. Other embodiment of a test generator, as used in conjunction with techniques such as the differential testing technique and other testing techniques of FIGS. 18a and 18b are possible.

As it is known to those skilled in the art, the foregoing techniques previously described regarding differential testing and using a test generator to generate standard conforming programs used therein are easily adaptable for use in generating and testing many different kinds of software. For example, the foregoing techniques can be used to test different versions of the same compiler as well as adapted to test compilers of different programming languages other than the "C" programming language conforming to another programming language standard.

The foregoing description affords a flexible and efficient way of automating test program generation using a grammar. Additionally, by incorporating constraints both statically and dynamically within the grammar used to produce a test program, the probability of producing a nonconforming program is minimized. The foregoing technique further provides flexibility by enabling the testing of software located on the same or different computer systems. Techniques are presented which minimize the amount of required developer attention and time required once a test failure has been detected.

Having described preferred embodiments of the invention, it will now become apparent to those of skill in the art that other embodiments incorporating its concepts may be provided. It is felt, therefore, that this invention should not be limited to the disclosed embodiments, but rather should be limited only by the spirit and scope of the appended claims.

What is claimed is:

1. A method executed in a computer system for testing machine executable programs, the method comprising the steps of:

generating a test program;

producing, using said test program and a first language processor, a first corresponding machine executable;

producing, using said first corresponding machine executable, a first output;

producing, using said test program and a second language processor, a second corresponding machine executable;

producing, using said second corresponding machine executable, a second output;

determining if there is a difference between said first and said second outputs; and detecting a test failure if there is a difference between said first and second outputs and said test program conforms to a runtime constraint included in a standard specifying how a machine executable produced using said test program behaves if said test program conforms to constraints included in said standard, said constraints including said runtime constraint, said test failure indicating that one of said first or second language processors is not in compliance with said standard.

2. The method of claim 1 wherein said test program is a source program including statements of a programming language, said source program conforming to a portion of predetermined constraints including syntactic constraints, semantic constraints, and said runtime constraint defined in accordance with a programming language standard for said programming language, said first and second language processors are, respectively, first and second compilers each associated with processing said programming language, and said first and second outputs are runtime results produced by executing, respectively, said first corresponding and said second corresponding machine executables, said method further including the steps of:

compiling said source program with said first compiler producing a first object file;

linking said first object file producing said first corresponding machine executable;

compiling said source program with said second compiler producing a second object file;

linking said second object file producing said second corresponding machine executable;

executing a runtime conformance checker to determine if said test program conforms to said runtime constraint; and if there is a difference between said first and second outputs, examining said first and second compilers to determine if there is a problem with one of said first and second compilers.

3. The method of claim 2 wherein said second compiler is an optimized version of said first compiler.

4. The method of claim 2 wherein said first compiler is associated with a first platform and said second compiler is associated with a second platform different from said first platform, each of said first and second platforms corresponding to an operating system and a hardware platform.

5. The method of claim 2 wherein said source program is generated using a generator which includes a grammar used to produce source programs comprising one or more statements of said programming language, said grammar comprising:

initial grammar rules defining said programming language and describing statements of said programming language in conformance with another portion of said predetermined constraints;

one or more nonterminal symbols;

one or more terminal symbols; and additional grammar rules which are dynamically added to said initial set of grammar rules during generation of said source program;

and wherein said source program includes statements corresponding to a portion of said terminal symbols, each of said statements being derived by randomly selecting one of said initial or one of said additional grammar rules during expansion of one of said nonterminal symbols.

6. The method of claim 5, wherein said first compiler resides in a first computer system, said second compiler resides in a second computer system, and said test generator resides in a third computer system, said first, second, and third computer systems communicating over a network.

7. The method of claim 1, wherein said test program is a source program including statements of a programming language, said test program conforms to a portion of predetermined constraints including syntactic constraints, semantic constraints, and said runtime constraint defined in accordance with a programming language standard for said programming language, said first and second language processors are, respectively, first and second compilers each associated with said programming language, and said first and second outputs are runtime results from executing, respectively, said first corresponding and said second corresponding machine executables, said method further including the steps of:

performing runtime conformance checking of said test program to determine if said test program corresponds to said runtime constraint; and reducing said test program to produce a reduced input if it is determined that said test program meets said runtime constraint and if a difference is determined between said first and second outputs.

8. The method of claim 7, wherein said test program is a first test program and said step of reducing said test program includes the steps of:

formatting said test program producing a second test program, wherein a line of said first test program corresponds to one or more lines in said second test program;

deleting one or more lines of said second test program if, by deleting said one or more lines of said second test program, said test failure reproduces;

simplifying one or more lines of said second test program by replacing a first language element of said programming language with a second language element of said programming language if, by simplifying said second test program, said test failure reproduces, said second language element being simpler than said first language element; and repeating said deleting step.

9. The method of claim 8, wherein said deleting step includes the steps of:

deleting one line of said second test program;

determining, in response to said step of deleting one line, if said test failure is reproducible using said second test program;

replacing, in response to determining that said test failure is not reproducible, the one line deleted in said deleting step;

repeating said deleting, said determining and said replacing steps for each line of said second test program beginning with said last line of said second test program if said programming language requires that an identifier be declared prior to use within said second test program.

10. The method of claim 8, wherein said step of reducing said test program further includes the steps of:

reformatting said second test program making said second test program more readable.

11. The method of claim 8, wherein said step of simplifying said second test program includes, performing upon said first test program, the steps of:

removing a block statement;

replacing a compound statement with a simpler statement;

removing parenthesis from an expression;

shorten a literal;

replace an identifier with a literal;

removing an operator and corresponding operand from an expression; and removing a record type definition.

12. A method of generating a source program including statements of a programming language, said method comprising the steps of:

expanding a nonterminal symbol of a grammar in accordance with grammar rules included in said grammar by selecting one or more of said grammar rules, said grammar rules defining said programming language and describing statements of said programming language wherein said statements are in conformance with a portion of a predetermined number of constraints, said grammar including one or more nonterminal symbols and one or more terminal symbols, each of said grammar rules specifying a mapping for one of said nonterminal symbols to one or more of said nonterminal and said terminal symbols;

dynamically modifying one of said grammar rules in response to one of said grammar rules selected in said expanding step;

dynamically adding a new rule to said grammar rules in response to one of said grammar rules selected in said expanding step;

repeating said expanding step until all nonterminal symbols have been expanded producing a derived string of terminal symbols; and producing said source program using said derived string.

13. The method of claim 12 further including step of:

associating a probability for selection with each of said grammar rules determining the probability with which said rule is selected during said step of expanding said nonterminal.

14. The method of claim 12 wherein said new rule is selected during said expanding step.

15. The method of claim 12 wherein said grammar rules include a portion of grammar rules initially produced, said method further including the steps of:

describing base type constraints of said programming language in said portion of grammar rules;

describing literal constraints of said programming language in said portion of grammar rules; and describing expression constraints of said programming language in said portion of grammar rules, said expression constraints reflecting assignment statement restrictions defined in accordance with said programming language.

16. The method of claim 15, wherein said expression constraints include left value expression constraints and right value expression constraints, said left value expression constraints describing expressions assigned a value/modified, said right hand expression constraints describing expressions whose values are assigned to one of said left value expressions.

17. The method of claim 12, wherein, in response to a first grammar rule being selected in said expanding step, said step of dynamically modifying a second grammar rule adds a new identifier to said first grammar rule, said new identifier being one of said terminal symbols, said first grammar rule referencing an identifier when no identifiers are available for use and causing the declaration of said new identifier which is dynamically added to said grammar by modifying said second grammar rule.

18. The method of claim 12, wherein, in response to a first grammar rule being selected in said expanding step, said step of dynamically adding a new rule to said grammar rules adds said new rule describing constraints of a derived type, said derived type being associated with a base type defined in said programming language, wherein, prior to adding said new rule, said grammar rules do not describe said derived type.

19. A test generator comprising:

a grammar including:

grammar rules defining a language and describing statements of said language wherein said statements conform to a portion of predetermined constraints, said predetermined constraints including syntactic and semantic constraints, one or more nonterminal symbols, said grammar rules providing a definition for a portion of said nonterminal symbols, and one or more terminal symbols used to define said nonterminal symbols;

means, coupled to said grammar, for expanding a nonterminal symbol to derive a set of one or more terminal symbols by selecting one or more of said grammar rules;

means, coupled to said expanding means and said grammar, for dynamically modifying one of said grammar rules while expanding a selected one of said nonterminal symbols;

means, coupled to said expanding means and said grammar, for dynamically adding one or more grammar rules while expanding a nonterminal; and a source code producer for generating a test using said set of terminal symbols derived from a portion of said grammar rules selected.

20. The test generator of claim 19 wherein said test generator further includes:

a random number generator for generating a random number;

means for associating a probability with each of said grammar rules;

and wherein said expanding means includes:

selecting means, coupled to said random number generator, for selecting one of said grammar rules in accordance with probabilities associated with said grammar rules.

21. The test generator of claim 20 wherein a second version of said test is generated using said generator and said generator includes a first grammar used to produce said test and a second grammar used to generate said second version.

22. The test generator of claim 20 further including:

means for dynamically modifying probabilities associated with said grammar rules in response to selection of one of said grammar rules.

23. A method executed in a computer system for testing software, said method comprising the steps of:

generating a first machine executable using a first source program and software being tested;

generating first execution results by executing said first machine executable;

generating a second machine executable using a second source program and said software being tested, said second source program being an equivalent version of said first source program;

generating second execution results by executing said second machine executable; and comparing said first and second execution results to determine if there is a problem in said software being tested.

24. The method of claim 23, wherein said first and second source programs conform to predetermined constraints, said predetermined constraints including syntactic, semantic, and runtime constraints.

25. The method of claim 23, wherein said first and second source programs are generated using a test generator, said test generator including two generation modes wherein one of said generation modes provides for generating said first source program and a second of said generation modes provides for generating said second source program.

26. The method of claim 23, wherein said first source program is generated using a test generator and said second source program is generated by using a third machine executable which transforms said first source program to said second source program.

27. A method executed in a computer system for testing machine executable programs, the method comprising the steps of:

generating a test program conforming to a predetermined runtime constraint included in a standard, said standard specifying how a machine executable produced using said test program behaves if said testprogram conforms to constraints included in the standard and when said test program is processed by a language processor generating a processor output used to produce said machine executable;

producing, using said test program and a first language processor, a first corresponding machine executable;

producing, using said first corresponding machine executable, a first output;

producing, using said test program and a second language processor, a second corresponding machine executable;

producing, using said second corresponding machine executable, a second output;

determining if there is a difference between said first and said second outputs; and detecting a test failure if there is a difference between said first and second outputs, said test failure indicating that one of said first or second language processors does not process said test program such that a machine executable, produced using a processor output generated by one of said first or said second language processors, behaves in accordance with said standard.

28. The method of claim 27 further including the step of:

examining said first and second outputs and said first and second machine executables to determine an action to take in response to detecting said test failure.

29. The method of claim 27 wherein said test program is generated using a test generator, said test generator using a grammar to generate said test program, said grammar comprising a set of one or more grammar rules, each of said grammar rule including symbols used in said grammar rules, said symbols including nonterminals and terminals, said step of generating said test program including the steps of:

selecting a grammar rule corresponding to a nonterminal;

replacing said nonterminal with terminals and nonterminals in accordance with said grammar rule selected; and dynamically adjusting a probability associated with a corresponding grammar rule to minimize generating a non-conforming test program, said probability affecting the frequency with which said corresponding grammar rule is selected, said non-conforming test program failing to conform to said runtime constraint.

30. The method of claim 27 wherein said step of generating said test program is performed a plurality of times each generating a new test program, said generating step being performed in said computer system while performing another of said method steps.

\* \* \* \* \*